United States Patent
Pettit

(10) Patent No.: US 12,542,658 B2
(45) Date of Patent: Feb. 3, 2026

(54) METHOD OF GENERATING SHARES OF A SHARED SECRET

(71) Applicant: nChain Licensing AG, Zug (CH)

(72) Inventor: Michaella Pettit, London (GB)

(73) Assignee: nChain Licensing AG, Zug (CH)

( * ) Notice: Subject to any disclaimer, the term of this patent is extended or adjusted under 35 U.S.C. 154(b) by 304 days.

(21) Appl. No.: 18/009,322

(22) PCT Filed: May 17, 2021

(86) PCT No.: PCT/EP2021/062941
§ 371 (c)(1),
(2) Date: Dec. 8, 2022

(87) PCT Pub. No.: WO2021/254702
PCT Pub. Date: Dec. 23, 2021

(65) Prior Publication Data
US 2023/0246825 A1  Aug. 3, 2023

(30) Foreign Application Priority Data
Jun. 15, 2020 (GB) .................................... 2009062

(51) Int. Cl.
*H04L 9/08* (2006.01)
(52) U.S. Cl.
CPC ............ *H04L 9/085* (2013.01); *H04L 9/0825* (2013.01); *H04L 9/0861* (2013.01)
(58) Field of Classification Search
CPC ..... H04L 9/085; H04L 9/0825; H04L 9/0861; H04L 9/3252; H04L 9/3255;
(Continued)

(56) References Cited

U.S. PATENT DOCUMENTS 7,246,232 B2   7/2007 Dutertre
8,144,874 B2   3/2012 Mcgough
(Continued)

FOREIGN PATENT DOCUMENTS

JP   H11239124 A   8/1999
JP   2007124032 A   5/2007
(Continued)

OTHER PUBLICATIONS

Combined Search and Examination Report for Application No. GB2009062.7, Mar. 12, 2021, 10 pages.
(Continued)

*Primary Examiner* — Bryan F Wright
(74) *Attorney, Agent, or Firm* — Messner Reeves LLP

(57) ABSTRACT

A computer-implemented method of generating shares of a shared secret, wherein each of a group of participants has a respective first secret share of the shared secret, wherein the method is performed by a first participant of the group and comprises: generating a respective blinding share of a shared blinding secret, obtaining at least a threshold number of respective intermediary shares from each of the first group of participants, wherein each respective intermediary share is generated based on a respective blinding share and a respective first secret share; generating an intermediary value based on each of the obtained intermediary shares; and generating a respective second secret share of the shared secret, wherein the respective second secret shared is generated based on the intermediary value and the respective blinding share.

20 Claims, 4 Drawing Sheets

(58) Field of Classification Search
CPC ... H04L 9/0816; H04L 9/3218; H04L 9/3247; H04L 2209/04
USPC .......................................................... 713/171
See application file for complete search history.

(56) References Cited

U.S. PATENT DOCUMENTS

| | | |
|---|---|---|
| 8,806,197 B2 | 8/2014 | Struik et al. |
| 9,813,244 B1 | 11/2017 | Triandopoulos et al. |
| 9,894,151 B2 | 2/2018 | Dhuse et al. |
| 10,211,981 B2 | 2/2019 | Camenisch et al. |
| 10,511,436 B1 | 12/2019 | Machani |
| 10,764,043 B2 | 9/2020 | Traynor et al. |
| 10,903,991 B1 | 1/2021 | Craige et al. |
| 11,323,267 B1 | 5/2022 | Griffin et al. |
| 11,481,761 B2 | 10/2022 | Lam |
| 11,563,567 B2 | 1/2023 | Le Saint |
| 11,637,708 B2 | 4/2023 | Hung |
| 11,973,867 B2 * | 4/2024 | Tysor ................... H04L 9/3239 |
| 12,309,196 B2 | 5/2025 | Pettit |
| 2002/0116611 A1 | 8/2002 | Zhou et al. |
| 2003/0009694 A1 | 1/2003 | Wenocur et al. |
| 2003/0059041 A1 | 3/2003 | MacKenzie et al. |
| 2010/0037055 A1 | 2/2010 | Fazio et al. |
| 2011/0138192 A1 | 6/2011 | Kocher et al. |
| 2012/0254619 A1 | 10/2012 | Dhuse et al. |
| 2014/0164769 A1 | 6/2014 | D'Souza |
| 2014/0325309 A1 | 10/2014 | Resch et al. |
| 2015/0100781 A1 * | 4/2015 | Yann ....................... H04L 9/085 713/165 |
| 2015/0288525 A1 | 10/2015 | Camenisch et al. |
| 2017/0223008 A1 | 8/2017 | Camenisch et al. |
| 2017/0250972 A1 | 8/2017 | Ronda et al. |
| 2018/0060248 A1 | 3/2018 | Liu et al. |
| 2018/0074889 A1 | 3/2018 | Resch et al. |
| 2018/0101697 A1 | 4/2018 | Rane et al. |
| 2018/0183601 A1 | 6/2018 | Campagna |
| 2018/0212772 A1 | 7/2018 | Leavy et al. |
| 2018/0307573 A1 | 10/2018 | Abraham et al. |
| 2018/0349867 A1 | 12/2018 | Trieflinger |
| 2018/0351754 A1 * | 12/2018 | Wallrabenstein ..... H04L 9/3278 |
| 2019/0007205 A1 | 1/2019 | Corduan et al. |
| 2019/0014124 A1 | 1/2019 | Reddy et al. |
| 2019/0280864 A1 | 9/2019 | Cheng et al. |
| 2019/0370792 A1 | 12/2019 | Lam |
| 2019/0372759 A1 | 12/2019 | Rix |
| 2020/0044863 A1 | 2/2020 | Yadlin et al. |
| 2020/0074450 A1 | 3/2020 | Fletcher et al. |
| 2020/0145231 A1 | 5/2020 | Trevethan |
| 2020/0153640 A1 | 5/2020 | Ranellucci et al. |
| 2020/0169391 A1 | 5/2020 | Kapp et al. |
| 2020/0213099 A1 | 7/2020 | Wright |
| 2020/0213113 A1 | 7/2020 | Savanah et al. |
| 2020/0259638 A1 | 8/2020 | Carmignani et al. |
| 2020/0259651 A1 | 8/2020 | Mohassel et al. |
| 2020/0311678 A1 | 10/2020 | Fletcher et al. |
| 2020/0353167 A1 | 11/2020 | Vivek et al. |
| 2021/0049600 A1 | 2/2021 | Spector et al. |
| 2021/0067345 A1 | 3/2021 | Shamai et al. |
| 2021/0089676 A1 | 3/2021 | Ford et al. |
| 2021/0090072 A1 | 3/2021 | Sewell et al. |
| 2021/0352054 A1 * | 11/2021 | Urian ................... H04L 9/0825 |
| 2021/0359843 A1 | 11/2021 | Li et al. |
| 2021/0377049 A1 | 12/2021 | Nix |
| 2022/0172180 A1 | 6/2022 | Komiyama |
| 2022/0182235 A1 * | 6/2022 | Tysor ................. G06F 16/9035 |
| 2022/0239509 A1 | 7/2022 | Jang et al. |
| 2022/0286276 A1 | 9/2022 | Li et al. |
| 2022/0311623 A1 | 9/2022 | Tomlinson et al. |
| 2022/0321340 A1 | 10/2022 | Tsitrin et al. |
| 2023/0066711 A1 | 3/2023 | Wright et al. |
| 2023/0361993 A1 | 11/2023 | Camenisch et al. |
| 2024/0054206 A1 | 2/2024 | Belgarric et al. |

FOREIGN PATENT DOCUMENTS

| | | | |
|---|---|---|---|
| JP | 2008199278 A | 8/2008 | |
| JP | 2013513312 A | 4/2013 | |
| JP | 2015194959 A | 11/2015 | |
| JP | 2018005089 A | 1/2018 | |
| JP | 2019507539 A | 3/2019 | |
| WO | WO-9937052 A1 * | 7/1999 | ............. H04L 12/18 |
| WO | 2015160839 A1 | 10/2015 | |
| WO | 2017145010 A1 | 8/2017 | |
| WO | 2018189656 A1 | 10/2018 | |
| WO | 2019034951 A1 | 2/2019 | |
| WO | 2019034986 A1 | 2/2019 | |
| WO | 2019158209 A1 | 8/2019 | |
| WO | 2019193452 A1 | 10/2019 | |
| WO | 2019246206 A1 | 12/2019 | |
| WO | 2020084418 A1 | 4/2020 | |
| WO | 2021213959 A1 | 10/2021 | |
| WO | 2021254702 A1 | 12/2021 | |
| WO | 2023072502 A1 | 5/2023 | |

OTHER PUBLICATIONS

Gennaro R., et al., "Robust Threshold DSS Signatures," International Conference on the Theory and Applications of Cryptographic Techniques, 2001, vol. 164, pp. 54-84.

International Search Report and Written Opinion for Application No. PCT/EP2021/062941, mailed on Aug. 3, 2021, 14 pages.

Pramanik S., et al., "VPSS: A Verifiable Proactive Secret Sharing Scheme in Distributed Systems," IEEE Military Communications Conference, Milcom, Oct. 13, 2003, vol. 2, pp. 826-831, XP010698401, DOI: 10.1109/MILCOM.2003.1290219, ISBN: 978-0-7803-8140-7.

Combined Search and Examination Report under Sections 17 and 18(3) for Application No. GB2111440.0 mailed on Jan. 25, 2022, 6 pages.

Combined Search and Examination Report under Sections 17 and 18(3) for Application No. GB2111441.8 mailed on Jan. 25, 2022, 6 pages.

Combined Search Report under Sections 17 for Application No. GB2111442.6 mailed on Jan. 25, 2022, 4 pages.

Dikshit P., et al., "Efficient Weighted Threshold ECDSA for Securing Bitcoin Wallet," 2017 ISEA Asia Security and Privacy (ISEASP), IEEE, Jan. 29, 2017, pp. 1-9, DOI: 10.1109/ISEASP.2017.7976994.

Ewa Syta et al: "Keeping Authorities "Honest or Bust" with Decentralized Witness Cosigning", 2016 IEEE Symposium on Security and Privacy (SP), May 1, 2016 (May 1, 2016), pp. 526-545.

Gennaro R., et aL, "Fast Multiparty Threshold ECDSA with Fast Trustless Setup," Proceedings of the 2018 ACM SIGSAC Conference on Computerand Communications Security, Oct. 2018, pp. 1179-1194.

Gennaro R., et al., "Robust Threshold DSS Signatures," International Conference on the Theory and Applications of Cryptographic Techniques, 1996, EUROCRYPT '96 pp. 354-371.

International Search Report and Written Opinion for Application No. PCT/EP2022/069246 mailed on Nov. 3, 2022, 15 pages.

International Search Report and Written Opinion for International Application No. PCT/EP2022/076636, mailed Jan. 20, 2023, 12 pages.

Wuille P., "BIP 32: Hierarchical Deterministic Wallets," Github Bitcoin BIPs, Feb. 2012, 6 pages, Retrieved from the Internet: URL: https://en.bitcoin.it/wiki/BIP_0032, Retrieved on Aug. 24, 2020.

Combined Search and Examination Report under Sections 17 and 18(3) for Application No. GB2017103.9 mailed on Jun. 28, 2021, 13 pages.

International Search Report and Written Opinion for Application No. PCT/EP2021/076686 mailed on Feb. 14, 2022, 17 pages.

Combined Search and Examination Report under Sections 17 and 18(3) for Application No. GB2011686.9, mailed on Apr. 22, 2021, 10 pages.

Fornaro D., "Elliptic Curve Hierarchical Deterministic Private Key Sequences: Bitcoin Standards and Best Practices," Master Thesis,

(56) References Cited

OTHER PUBLICATIONS

Apr. 19, 2018, retrieved from the URL: https://www.politesi.polimi.it/bitstream/10589/140112/1/2018_04_Fornaro.pdf, 53 pages.
Goldfeder S., et al., "Securing Bitcoin Wallets via Threshold Signatures," 2014, retrieved from the URL: https://www.cs.princeton.edu/stevenag/bitcoin_threshold_signatures.pdf, sections "Threshold ECDSA Signature Generation" and "Threshold Deterministic Address Derivation", 11 pages.
International Search Report and Written Opinion issued in International Application No. PCT/EP2021/067673, mailed on Sep. 28, 2021, 13 pages.
Luzio A.D., et al., "Arcula: A Secure Hierarchical Deterministic Wallet for Multi-asset Blockchains," Section 2, Dec. 10, 2019, 33 pages.
Cachin Christian, "Security and Fault-tolerance in Distributed Systems—Distributed Cryptography", Dec. 31, 2012 (Dec. 31, 2012), XP055903112, Retrieved from the Internet: URL: https://cachin.com/cc/sft12/ distcrypto.pdf, sections 7.2, 7.3, 7.4.
Combined Search and Examination Report under Sections 17 and 18(3) for Application No. GB2105992.8 mailed on Jan. 17, 2022, 9 pages.
Damgard I., et al., "Fast Threshold ECDSA with Honest Majority", Aug. 23, 2020, Computer Vision—ECCV2020: 16th European Conference, Proceedings; Part of the Lecture Notes in Computer Science, 35 pages.
Denis Kolegov et al: "Towards Threshold Key Exchange Protocols", arxiv.org, Cornell University Library, 201 Olin Library Cornell University Ithaca, NY 14853, Dec. 27, 2020 (Dec. 27, 2020), XP081849900, section 2.2.
GB2101590.4 Combined Search and Examination Report dated Jul. 30, 2021, 7 pages.
International Search Report and Written Opinion for Application No. PCT/EP2022/058085 mailed on Jul. 26, 2022, 14 pages.
Joonsang Baek et al: "Simple and efficient threshold cryptosystem from the gap diffie-hell ma n group", GLOBECOM '03. 2003—IEEE Global Telecommunications Conference. Conference Proceedings. San Francisco, CA, Dec. 1-5, 2003; [IEEE Global Telecommunications Conference] New York, NY, vol. 3, Dec. 1, 2003 (Dec. 1, 2003), pp. 1491-1495.
PCT/EP2022/050116 International Search Report and Written Opinion dated Apr. 26, 2022, 14 pages.
Pettit M. "Shared Secrets and Threshold Signatures," May 1, 2020, [retrieved on Jun. 14, 2021], pp. 1-23, Retrieved from the Internet: URL: https://nakasendoproject.org/Threshold-Signatures-whitepaper-nchain.pdf, sections 4 and 5; p. 22.
Hideyuki F., et al., "Updating Method of Distributed Data in Secret Sharing System," Research Report of Computer Security (CSEC), Japan, Information Processing Society of Japan, May 15, 2014, vol. 2014-CSEC-65, No. 1, pp. 1-6, 10 pages.
Shingu T., et al., "Updating Method of Verifiable Distributed Data in the Secret Sharing Scheme," Japan, Information Processing Society of Japan, Nov. 28, 2014, vol. 2014-CSEC-67, No. 5, pp. 1-6, 9 pages.
Courtois N.T., et al., "Stealth Address and Key Management Techniques in Blockchain Systems," Proceedings of the 3rd International Conference on Information Systems Security and Privacy (ICISSP 2017), Feb. 21, 2017, pp. 559-566.
Boldyreva A., et al., "Threshold Signatures, Multisignatures and Blind Signatures Based on the Gap-diffie-hellman-group Signature Scheme," International Workshop on Public Key Cryptography, Berlin, Heidelberg: Springer Berlin Heidelberg, 2003, 16 pages.
Camenisch J., et al., "Short Threshold Dynamic Group Signatures," International conference on security and cryptography for networks Cham: Springer International Publishing, 2020, pp. 401-423.

* cited by examiner

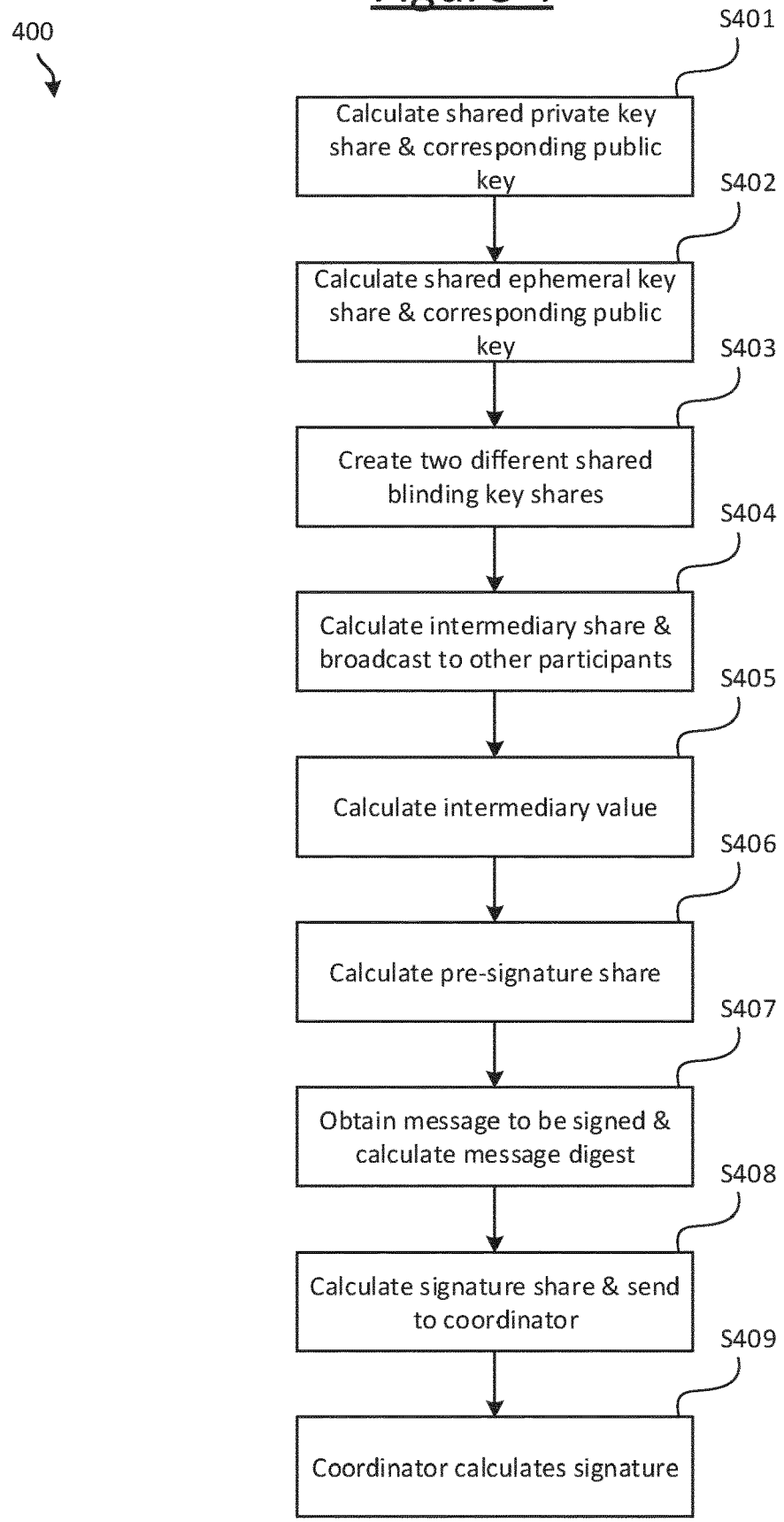

METHOD OF GENERATING SHARES OF A SHARED SECRET

CROSS REFERENCE TO RELATED APPLICATIONS

This application is the U.S. National Stage of International Application No. PCT/EP2021/062941 filed on May 17, 2021, which claims the benefit of United Kingdom Patent Application No. 2009062.7, filed on Jun. 15, 2020, the contents of which are incorporated herein by reference in their entireties.

TECHNICAL FIELD

The present disclosure relates to a method of generating shares of a shared secret. For instance, the method may be used to generated new shares of a shared private key.

BACKGROUND

In general, a shared secret may be used to share a data item that is distributed amongst a group of participants. Each participant has a different share of the secret. Normally, the secret can only be reconstructed when a certain number (referred to as the "threshold") of participants make their respective shares available, e.g. to be combined together to calculate the secret.

Public-key cryptography is a type of cryptographic system that uses pairs of keys: private keys which are known only to the owner of the private key, and public keys which are generated based on the corresponding private key and which may be disseminated without compromising the security of the private key.

Public-key cryptography enables a sender to encrypt a message using a recipient's public key (i.e. the public key corresponding to a private key known only to the recipient). The encrypted message can then only be decrypted using the recipient's private key.

Similarly, a sender can use their own private key to sign a message, e.g. to prove that the message is being sent by the sender, and/or to indicate that the sender agrees with the message. The signer (i.e. the party generating the signature) uses their private key to create a digital signature based on the message. Creating a digital signature based on a message means supplying the message and private key to a function that generate the signature based on both the message and private key. The signature is added to (e.g. tagged onto) the message or otherwise associated with the message. Anyone with the signer's corresponding public key can use the same message and the digital signature on the message to verify whether the signature was validly created, i.e. whether the signature was indeed made using the signer's private key. As well as ensuring the authenticity of a message, digital signatures also ensure the integrity and non-repudiation of the message. That is, a digital signature can be used to prove that a message has not been changed since it was signed with the signature, and that the creator of a signature cannot deny in the future that they created the signature.

A digital signature scheme typically involves three procedures, i.e. algorithms. A key generation algorithm is used to generate a random private key and a corresponding public key. A signing algorithm is used to generate a signature based on a message and the private key. A verification algorithm is used to verify, given a public key and the message, whether the signature has been generated using the corresponding private key and according to the signing algorithm.

A common use of a shared secret is as a shared private key of a private-public key pair. That is, the private key may be distributed amongst a group of participants such that no single participant has access to the private key. Therefore no single participant can generate a valid signature of a message. Instead, some or all of the participants must together generate the private key in order for the signature to be generated.

Instead of the participants sharing their private key shares in order to generate a signature, they may instead use a threshold signature scheme. A threshold signature scheme allows a threshold number of participants in a group to create a digital signature based on a message using individual shares of a shares private key, without the private key being made available to any one participant. Here, a digital signature is a signature which is generated based on the message to be signed. In such a scheme, the signature can only be created if the threshold number of participants agree to generate the signature on the message. Any attempt to generate a signature using a smaller number of participants will not generate a valid signature. Therefore, a valid signature by the group (i.e. one generated using the message and the shared private key) provably had the threshold number of people agree to generate the signature. This also implies that any adversary needs to obtain the threshold number of shares of the private key to forge a signature with that private key.

SUMMARY

There are scenarios where it would be desirable to be able to generate new shares of a shared secret without changing the shared secret itself. For instance, one or more participants who have a respective share of the shared secret may leave the group of participants such that their respective shares are no longer available to reconstruct the shared secret, or perform calculations using those shares, e.g. to generate signature shares of a threshold signature scheme. Or as another example, rather than as a result of participants leaving the group, some shares of the secret may no longer be available as a result of being lost or compromised. Those shares may need to be replaced. As another example, the group of participants may be expanded to include one or more additional participants, and therefore those participants require their own shares of the shared secret.

Similarly, there are scenarios where it would be desirable to alter the threshold of the shared secret. That is, to change the number of secret shares required to reconstruct the shared secret. For instance, increasing the threshold of the shared secret may improve the security of the shared secret as a malicious party would have to gain access to more of its shares in order to reconstruct the shared secret. This is particularly relevant when the shared secret is a private key that is used to encrypt data or control access to a resource.

According to one aspect disclosed herein, there is provided a computer-implemented method of generating shares of a shared secret, wherein each of a group of participants has a respective first secret share of the shared secret, wherein the method is performed by a first participant of the group and comprises: generating a respective blinding share of a shared blinding secret, obtaining at least a threshold number of respective intermediary shares from each of the first group of participants, wherein each respective intermediary share is generated based on a respective blinding share and a respective first secret share; generating an intermediary value based on each of the obtained intermediary shares; and generating a respective second secret share of the shared secret, wherein the respective second secret shared is generated based on the intermediary value and the respective blinding share.

The present scheme may be used to generate new shares of the shared secret in order to increase or decrease the number of participants that have a valid share of the shared secret. Here, a valid share may be deemed valid in the sense that it is one of the second secret shares, and only the use of the second secret shares by the group of participants as a whole will result in valid calculations.

The present scheme may also be used to generate new shares of the shared secret in order to change the threshold of the shared secret, such that the second shares of the shared secret have a different threshold compared to that of the first shares of the shared secret.

Shares that have been lost or compromised may be replaced with the present scheme. If an "old" share is compromised, then the present invention renders that share useless as the other participants in the scheme will only use the new shares. Therefore an attacker must 'begin again' in the sense that they must attempt to compromise another share.

As mentioned above, shared secrets are often used in the context of private keys, i.e. a private key may be a shared secret. More generally, a shared secret may be any data that requires a threshold number of people to either reveal it or to do more calculations with it.

For instance, the data may be medical data, or other such private data, where it is preferred not to share the actual data (e.g. biometric or genetic data associated with an individual). Sharing medical data in the form of a shared secret allows for calculations to be done with the data (e.g. statistical analysis) without revealing sensitive data. Where one or more of the participants in the scheme is the owner of the data, that owner will need to participate in the calculation of the results, thus allowing the owner to approve or deny access to their data. Those other participants with a share can perform calculations with the data and obtain results without learning the individual secrets. The present invention allows the owner of the data to update the shares in order to 'remove' the other participants from the scheme.

Another use case of updating a shared secret is that a group of participants my create multiple 'schemes' with the same shared secret, which in turn improves the security of the shared secret. The participants can create a shared secret and then perform multiple iterations or rounds of re-issuing shares. The result is that the participants all have multiple shares of the same shared secret that can be combined with the shares of the other participants corresponding to the same 'scheme' or 'round' to find the secret. If these shares are all stored together, an attacker not only needs to attack multiple locations (i.e. participants) but also needs to work out the correct combination of the shares.

BRIEF DESCRIPTION OF THE DRAWINGS

To assist understanding of embodiments of the present disclosure and to show how such embodiments may be put into effect, reference is made, by way of example only, to the accompanying drawings in which.

DETAILED DESCRIPTION OF EMBODIMENTS

Preliminaries

Figure 1:
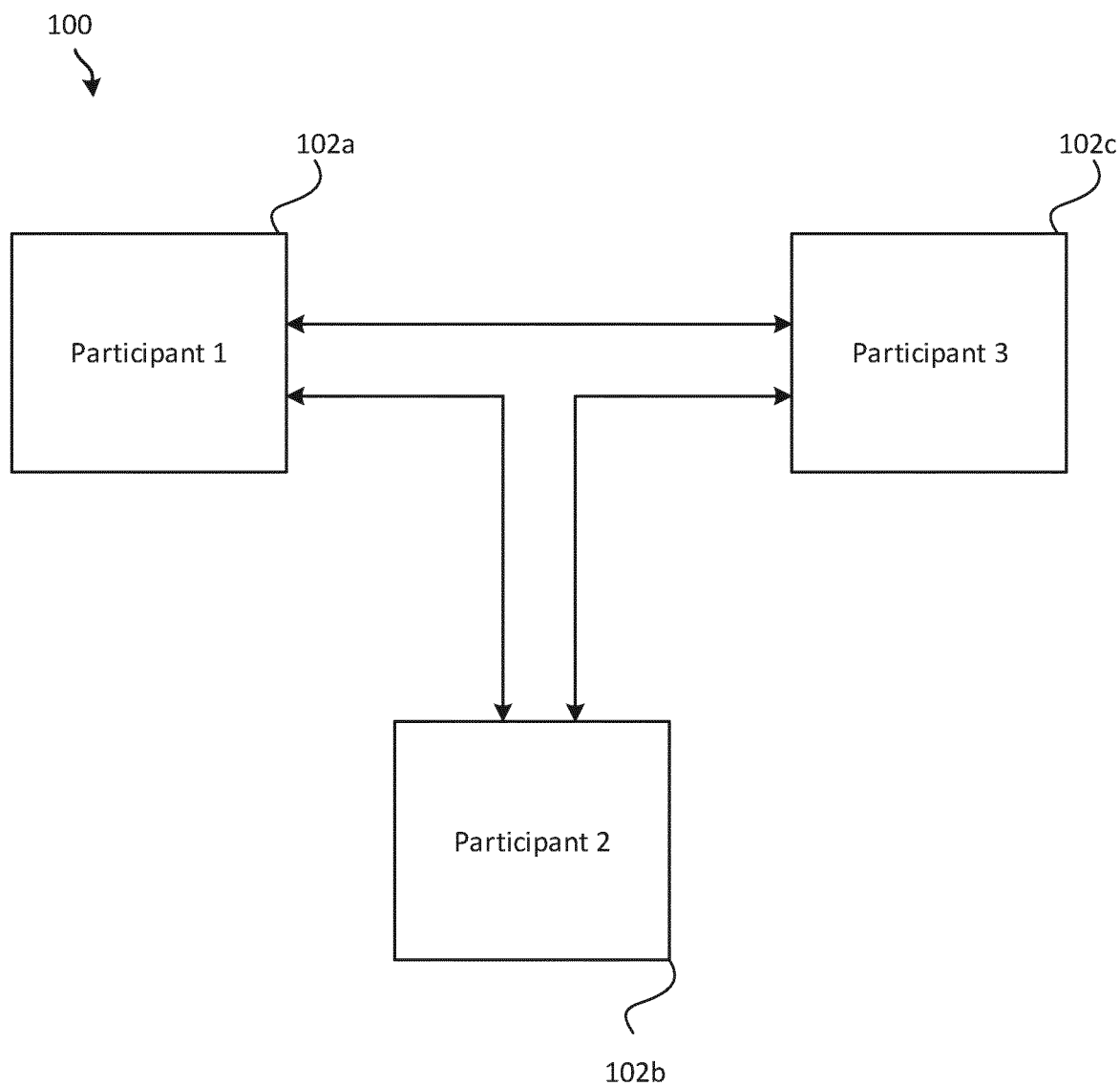
FIG. 1 schematically illustrates an example system for updating shares of a shared secret according to embodiments of the present invention, FIG. 2 schematically illustrates an example method for updating shares of a shared secret according to embodiments of the present invention, FIG. 3 schematically illustrates an example system for generating a signature of a message according to some embodiments of the present invention, and FIG. 4 schematically illustrates an example method for generating a signature share of a message according to embodiments of the present invention.

Whilst the following examples are described in terms of elliptic curve cryptography, the invention is not limited to any one particular cryptographic scheme and may in general be applied to any cryptographic scheme, e.g. RSA or other public key cryptography schemes.

Elliptic Curve Groups

An elliptic curve E satisfies the equation:

$$y^2 = x^3 + ax + b \bmod p$$

where a, b $\in \mathbb{Z}_p$ and a, b are constants satisfying $4a^3 + 27b^2 \neq 0$. The group over this elliptic curve is defined to be the set of elements (x, y) satisfying this equation along with the point at infinity $\mathcal{O}$, which is the identity element. The group operation on the elements in this group is called elliptic curve point addition and denoted by +. This group is denoted by $E(\mathbb{Z}_p)$ and its order by n.

This group operation can be used to define another operation on the elements called point multiplication denoted by •. For a point $G \in E(\mathbb{Z}_p)$ and a scalar $k \in \mathbb{Z}_n^*$, the point k·G is defined to be the point G added to itself k times.

In elliptic curve cryptography, a private key is defined to be a scalar $k \in \mathbb{Z}_n \setminus \{0\}$ where $\mathbb{Z}_n \setminus \{0\}$ is notation for the set $\{1, \ldots, n-1\}$, and the corresponding public key is the point k·G on an elliptic curve. For instance, in some blockchain protocols, the elliptic curve is chosen to be the secp256k1 elliptic curve, and the values a, b, and p are completely specified by this curve. The order n of this group has been calculated given these values, which in the case of this curve is a prime, and the secp256k1 standard also specifies a point G which is to be used as the generator of this group.

Elliptic Curve Digital Signature Algorithm

In order to create a signature on a message msg, with the private key a, the following steps are taken:
1. Calculate the message digest e=hash(msg), where may be any hash function. For instance, in some examples hash(msg)=SHA256(SHA256(msg)) where SHA256 (■) is the SHA-256 hash function. Note that instead the message may be hashed only once, or more that two times with the same or different hash functions.
2. Chose a random integer $k \in \{1, \ldots, n-1\}$, where n is the order of the elliptic curve, e.g. the secp256k1 curve. In the following, k is referred to as the ephemeral private key.
3. Calculate the ephemeral public key corresponding to this ephemeral private key k. $G=(R_x, R_y)$.
4. Calculate $r=R_x \bmod n$. If r=0, return to step 2.
5. Calculate the multiplicative inverse of the ephemeral key $k^{-1} \bmod n$.
6. Calculate $s=k^{-1}(e+ar) \bmod n$. If s=0, return to step 2.
7. The signature on the message msg is (r, s).

The ephemeral key must be kept secret, otherwise the private key can be calculated, given a message and signature. Additionally, each time a signature is generated, a different ephemeral key must be used. If this is not the case, it is possible to derive the private key a given two different signatures and their corresponding messages.

Given a message msg, a public key $P=a \cdot G$, and corresponding signature $(r, s)$, then one can verify the signature by completing the following steps:

1. Calculate the message digest $e=\text{hash}(\text{msg})$, e.g. $e=\text{SHA256}(\text{SHA256}(\text{msg}))$.
2. Calculate the multiplicative inverse $s^{-1}$ of s modulo n.
3. Calculate $j_1 = es^{-1} \bmod n$ and $j_2 = rs^{-1} \bmod n$.
4. Calculate the point $Q = j_1 \cdot G + j_2 \cdot P$.
5. If $Q = \mathcal{O}$, the point at infinity, the signature is invalid.
6. If $Q \neq \mathcal{O}$, then let $Q := (Q_x, Q_y)$, and calculate $u = Q_x \bmod n$. If $u = r$, the signature is valid.

In threshold signature schemes, this private key a is split into key shares that are distributed amongst participants in a threshold scheme group.

Joint Verifiable Random Secret Sharing

Assume that N participants want to create a joint secret that can only be regenerated by at least $(t+1)$ of the participants in the scheme. To create the shared secret, the following steps are taken:

1. The participants agree on the unique label i for each participant. Each participant i generates $(t+1)$ random numbers $$a_{ij} \in_R \mathbb{Z}_n \backslash \{0\}, \forall j = 0, \ldots, t,$$

where $\in_R$ means a randomly generated element of the set $\mathbb{Z}_n \backslash \{0\}$ where $\mathbb{Z}_n \backslash \{0\}$ is notation for the set $\{1, \ldots, n-1\}$. Then each participant has a secret polynomial of order t $$f_i(x) = a_{i0} + a_{i1}x + \ldots + a_{it}x^t \bmod n,$$

for $i = 1, \ldots, N$. Note that we omit the mod n notation from now on, and it is assumed that all arithmetic operations over integers are done modulo n.

2. Each participant i sends the value $f_i(j)$ to participant j e.g. using a secure communication channel with participant j only.

3. Each participant i calculates their own private secret share of a shared secret polynomial as $$a_i := \sum_{j=1}^{N} f_j(i).$$

A shared secret share is a point with the form $(i, a_i)$, where i is the participants label in the scheme. This method for creating a secret share of a, as described in steps 1-3, is denoted herein by $a_i = \text{JVRSS}(i)$ for participant i. Note that "JVRSS" typically stands for "Joint verification random secret sharing" and includes steps 4 and 5 as well. However, throughout this document JVRSS is taken to mean performing at least steps 1 to 3, where steps 4 and 5 are optional steps.

Now that the participants have generated a shared polynomial, they can each verify that the other participants have shared the correct information to all participants, and that all participants have the same shared polynomial. This is done in the following way.

4. Each participant i broadcasts to all participants the obfuscated coefficients $$a_{ik} \cdot G,$$

for $k = 0, \ldots, t$.

5. Each participant i checks that each participant j has correctly calculated the polynomial point $f_j(i)$ by calculating $f_j(i) \cdot G$ and verifying that $$f_j(i) \cdot G \stackrel{?}{=} \sum_{k=0}^{t} i^k (a_{jk} \cdot G) \forall j = 1, \ldots, N.$$

If all participants find that this equation holds for each polynomial, then the group can collectively be sure that they have all created the same shared polynomial.

Reconstructing a Shared Secret

Assume a participant wants to reconstruct a shared secret a which is the zeroth order of a shared polynomial. Given $(t+1)$ points on this polynomial of the form $$(1, a_1), \ldots, ((t+1), a_{t+1}),$$

then to find the shared secret a, one calculates $$\text{interpolate}(a_1, \ldots, a_{t+1}) = \left( \sum_{l=1}^{t+1} a_l \prod_{\substack{1 \leq j \leq (t+1), \\ j \neq l}} (-j)(l-j)^{-1} \right) = a,$$

which is derived from a general formula known as "Lagrange Interpolation".

Public Key Calculation

Given the N zeroth-order private polynomial coefficient public keys $a_{i0} \cdot G$ for $i = 1, \ldots, N$ shared in step 4 of JVRSS, each participant calculates the shared public key P using $$P = a \cdot G = \sum_{j=1}^{N} a_{j0} \cdot G,$$

corresponding to the shared secret a.

Addition of Shared Secrets

To calculate the addition of two shared secrets that are shared amongst a group of N participants, where each secret polynomial has order t, without any entity knowing the individual secrets, the following steps are taken:

1. Generate the first shared secret a, where participant i's share is given by $a_i = \text{JVRSS}(i)$ for $i = 1, \ldots, N$ with a threshold of $(t+1)$.
2. Generate the second shared secret b, where participant i's share is given by $b_i = \text{JVRSS}(i)$, with a threshold of $(t+1)$.
3. Each participant i calculates their own additive share $$v_i = a_i + b_i \bmod n.$$

4. All participants broadcast their additive share vi to all other participants.
5. Each participant interpolates over at least $(t+1)$ of the shares vi to calculate $$v = \text{interpolate}(v_1, \ldots, v_{t+1}) = a + b.$$

This method for the addition of shared secrets is denoted by ADDSS (i) for participant i, which results in each participant i knowing $v = (a+b)$.

Product of Shared Secrets

To calculate the product of two shared secrets that are both shared amongst a group of N participants, where each secret polynomial has order t, the group takes the following steps:
1. Generate the first shared secret a, where participant i's share is given by $a_i$=JVRSS(i) for i=1, ..., N. The shared secret polynomial has order t, meaning (t+1) participants are required to recreate it.
2. Generate the second shared secret b, where participant i's share is given by $b_i$=JVRSS(i), and the shared secret polynomial again has order t.
3. Each participant calculates their own multiplicative share $\mu_i$ using $$\mu_i = a_i b_i.$$

4. All participants broadcast their multiplicative share $\mu_i$ to all other participants.
5. Each participant interpolates over at least (2t+1) of the shares $\mu_i$ at 0 to calculate $$\mu = \text{interpolate}(\mu_1, \ldots, \mu_{2t+1}) = ab.$$

This method for calculating the product of two shared secrets is denoted herein by $\mu$=ab=PROSS (i) for participant i.

Inverse of a Shared Secret

In order to calculate the inverse of a shared secret a, the following steps are taken:
1. All participants calculate the product of shared secrets PROSS (i), the result of which is $\mu$=ab mod n.
2. Each participant calculates the modular inverse of u which results in $$\mu^{-1} = (ab)^{-1} \mod n.$$

3. Each participant i calculates their own inverse secret share by calculating $$a_i^{-1} = \mu^{-1} b_i.$$

This method for calculating the inverse of shared secrets is denoted by $a_i^{-1}$=INVSS(i) for participant i.

Shared Private Key Generation and Verification

To calculate a shared private key a between N≥2t+1 participants, t+1 of which are required to create a signature, the participants execute JVRSS with a threshold of t+1 and public key calculation as described above. The result is that every participant i=1, ..., N has a private key share $a_i$ and the corresponding shared public key P=(a·G).

Ephemeral Key Shares Generation

To generate ephemeral key shares and the corresponding r, as is required in a signature, a group of size N with a shared private key a of threshold (t+1) execute the following steps:
1. Generate the inverse share of a shared secret $k_i^{-1}$=INVSS(i), where (t+1) shares are required to recreate it.
2. Each participant calculates $$(x, y) = \sum_{i=1}^{N} (k_{i0} \cdot G),$$

using the obfuscated coefficients shared in the verification of $k_i$, then they calculate $$r = x \mod n.$$

3. Each participant i stores (r, $k_i^{-1}$).

Addition of Secrets with Different Thresholds

In the case of addition of secrets of order t and t', the addition of the two secrets requires max(t, t')+1 number of shares to calculate it. The reason behind this is that the addition step of the shares of the shared secrets creates a share of a new polynomial. This new additive polynomial is equivalent to the result of the addition of the individual polynomials of the two shared secrets. Adding two polynomials is adding the corresponding coefficients at each order of x. Therefore, the order of the additive polynomial must be the same order as the highest order of the two polynomials. This can be generalised to the addition of more than two polynomials, where the order of the resulting polynomial is the same as the order of the highest order individual polynomial.

Once the addition of two secrets with different thresholds has been calculated, the security of the higher threshold secret is reduced. This is because if one now knows the result (a+b) with respective thresholds t, t' and assume that t<t', then one can calculate a with t shares, and then calculate (a+b)−a=b, and so the value b has been calculated with only t shares. This lower threshold is referred to below as the 'implicated threshold' of b.

Multiplication of Secrets with Different Thresholds

In the case of multiplication of two secrets with a threshold of t and t', the calculation of the multiplication requires t+t'+1 shares. In this case, the multiplication of shares of two polynomials results in a share on a new polynomial. This new polynomial is the result of multiplying the two individual polynomials and so the order of the result is the addition of the order of the two individual polynomials.

Multiplication can also be generalised to any number of shared secrets, with the resulting threshold being the sum of the individual thresholds plus 1, $\Sigma_\rho t_\rho +1$, where $\rho$ runs over the individual shared secrets.

Similar to addition, the multiplication of two secrets with different thresholds results in an implicated threshold of the higher threshold secret. As before, if ab is known where a has a threshold of t and b has a threshold of t', and t<t', then both a and b can be calculated with t shares. First, one can calculate a and using (ab)$a^{-1}$ find b with only t shares of a secret.

Combining the Addition and Multiplication of Shared Secrets in One Step

It is possible to generalise the above to calculate any combination of addition and multiplication in one step. Assume a group of N participants want to calculate the result ab+c, where a, b, c are shared secrets with thresholds ($t_a$+1), ($t_b$+1), ($t_c$+1) respectively. There is a condition which is max($t_a$+$t_b$, $t_c$)<N, that is, the number of participants of the scheme must be greater than the maximum between the order of the secret c and the order of the result of the multiplication of the secrets a and b.
1. Each participant i calculates their secret shares $a_i$=JVRSS(i), $b_i$=JVRSS(i), $c_i$=JVRSS(i) with thresholds ($t_a$+1), ($t_b$+1), ($t_c$+1) respectively.
2. Each participant i calculates the share $\lambda_i = a_i b_i + c_i$.
3. Each participant i shares the result $\lambda_i$ with the other participants.
4. Each participant interpolates over max($t_a$+$t_b$, $t_c$)+1 shares to find the result $\lambda$=int($\lambda_1, \ldots, \lambda_i, \ldots$)=ab+c.

This is done in the calculation of a shared signature according to some embodiments below. That is, there is an interpolation over $s_i = k_i^{-1}(e + a_i r)$. This is essentially the case above with $a_i b_i = k_i^{-1} a_i r$ and $c_i = k_i^{-1} e$. In this case $t_a + t_b = 2t$ and $t_c = t$, and interpolation is over max($t_a$+$t_b$, $t_c$)+1=2t+1 shares.

Generating Secret Shares

FIG. 1 illustrates an example system 100 for implementing embodiments of the invention. As shown, the system 100 comprises a plurality of parties (also referred to below as "participants") 102. Only three participants 102 are shown in FIG. 1, but it will be appreciated that in general the system may comprise any number of participants. Each of the participants 102 operates respective computing equipment.

Each of the respective computing equipment of the respective participants 102 comprises respective processing apparatus comprising one or more processors, e.g. one or more central processing units (CPUs), accelerator processors (GPUs), application specific processors and/or field programmable gate arrays (FPGAs). The respective computing equipment may also comprise memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive. The respective computing equipment may comprise at least one user terminal, e.g. a desktop or laptop computer, a tablet, a smartphone, or a wearable device such as a smartwatch. Alternatively or additionally, the respective computing equipment may comprise one or more other networked resources, such as cloud computing resources accessed via the user terminal (the cloud computing resources comprising resources of one or more physical server devices implemented at one or more sites). It will be appreciated that any act described as being performed by a party of the system 100 may be performed by the respective computing apparatus operated by that party.

Each of the participants 102 are configured to transmit data to one, some or all of the other participants 102 over the internet using a LAN or WAN connection, or via alternative wired or wireless communication means. Unless the context requires otherwise, reference to a participant 102 transmitting data may be understood as transmitting data to other participants 102 individually, e.g. via a secure communication channel between the first participant 102a and the second participant 102b, or broadcasting to the group as a whole, e.g. via email or other means. Again, unless the context requires otherwise, each participant 102 may transmit data in raw form, or in encrypted form. For instance, the data may be encrypted using a public key of a recipient participant before being send to that recipient participant.

One, some or all of the participants has (e.g. stores in memory) a respective share of a shared secret. The participants having a share of the shared secret will be collectively referred to as a first group of participants. In some examples, one or some of the participants may not have a respective share of the shared secret. For instance, the respective share of a participant may have been lost (e.g. the memory storing the secret share may have been corrupted) or stolen. The participants not having a share of the shared secret will be collectively referred to as a second group of participants.

The shared secret is in fact a data item, and the data item is "secret" in the sense that it is desirable for the data item to be kept private, i.e. not publicly accessible. The shared secret may be a shared private key, e.g. of a public-private key pair. The following examples will refer to the shared secret as a shared private key. These examples will also refer to shares of the shared secret as private key shares. However it will be appreciated that these are just illustrative examples.

Techniques for generating shares of a private key (and shared secrets in general) will be familiar to the skilled person.

Preferably, the first participant 102a is configured to generates a first private key share $a_1$ of a private key a using a joint secret sharing scheme (JVRSS), e.g. using the JVRSS technique described above. For instance, the first participant 102a may have an index of 1, and generate the first private key share using $a_1$=JVRSS(1) for participant 1, where the private key is denoted by a. Each participant 102 may generate a respective private key share $a_i$. For instance, the second participant 102b may generate a second private key share using $a_2$=JVRSS(2) for participant 2, and so on.

Generating a first private key share $a_1$ using a joint secret share scheme may comprise generating a set of numbers $a_{1j} \in_R \mathbb{Z}_n \setminus \{0\}$, $\forall j=0, \ldots, t$, and then generating a first polynomial $f_1(x)=a_{10}+a_{11}x+\ldots+a_{1t}x^t$ mod n, where the set of numbers are the coefficients of the polynomial. Each of the other participants 102 may generate a respective polynomial using a respective set of numbers. For instance, the second participant 102b generates a second polynomial $f_2(x)=a_{20}+a_{21}x+\ldots+a_{2t}x^t$ mod n. The participants 102 then transmit, to each other participant, a value of their respective function evaluated at the index of that other participant. For instance, the first participant 102a evaluates $f_1(2)$ for the second participant 102b and then transmits that value to the second participant 102b, evaluates $f_1(3)$ for the third participant 102c and then transmits that value to the third participant 102c, and so on. The first participant 102a obtains the respective values generated, as a function of the first participant's index, by the other participants 102. The values may be transmitted over the internet, or via other means. The values may be transmitted via respective secure communication channels between respective pairs of the participants. Instead of transmitting directly, one or more participants 102 (e.g. the first participant 102a) may broadcast their respective values. Having obtained at least the threshold number of values from at least the threshold number of participants, the first participant 102a generates the first private key share based on the first value and each other obtained data value, e.g. $f_2(1)$, $f_3(1)$, etc.

The first participant 102a may calculate the corresponding public key a·G based on a set of obfuscated coefficients, where the coefficients are used to generate the respective private key shares $a_i$ of each participant 102. That is, when generating the ephemeral private key share $k_i$, each participant 102 may share the obfuscated coefficients $a_{ij}$·G with each other participant 102. The coefficients are obfuscated by a common generator point G on the chosen elliptic curve. These obfuscated coefficients may be transmitted between participants 102 directly, or broadcast to the group. For instance, the first participant 102a may broadcast the obfuscated coefficients $a_{10}$·G, $a_{11}$·G, $a_{12}$·G, and so on. The public key corresponding to the private key may then be calculated as $$P = a \cdot G = \sum_{j=1}^{N}(a_{j0} \cdot G).$$

It will be appreciated that the corresponding public key need not be generated in order to generate the private key shares $a_i$, and as such this is an optional feature that the participants 102 may implement should they choose to.

Note that the private key shares $a_i$ may be generated using an alternative method, i.e. not using the JVRSS method described above. Methods for generating shares of a private key are, in themselves, known in the art. Similarly, methods for distributing shares of a private key (or other such data) are, in themselves, known in the art. That being said, the private key share $a_i$ may be generated in a number of ways. For instance, a dealer (e.g. a trusted one of the participants 102 or an independent party) may be used to generate and distribute one, some or all of the private key shares $a_i$, e.g. using a Shamir's secret sharing scheme. One such scheme that may be used for generating and distributing private key shares $a_i$ is described in WO2017145010A1.

Regardless of the particular method used to generate the private key shares, each of the first group of participants 102 has (e.g. stores) a respective private key share $a_i$ of the private key a.

Each of the participants 102 of the new scheme (i.e. the scheme with the new shares of the private key) generates a respective blinding key share of a shared blinding key. A blinding key share is used to obfuscate or otherwise "blind" or "hide" another key share. That is, a blinding key share is applied to a first key share to hide the first key share, such that the resulting key share can be shared without revealing the first key share. In a naïve example, the first key share may be 100 and the blinding key share may be 74, allowing the number 174 to be shared. Now, without knowing that the blinding key share is 74, a recipient could not know for sure the first key share. It will be appreciated that in reality the key shares may be much larger numbers.

Recall that "key share" and "key" are used for brevity and in general may be replaced with "secret share" and "secret" respectively. In practice, a "share" and a "key" are likely to be large numbers. These participants 102 (referred to below as the "new group") may contain participants only from the first group of participants, or from participants from a combination of the first and second groups of participants.

Preferably the blinding key share $\kappa_i$ may be calculated using a joint secret sharing scheme, e.g. using the JVRSS technique described above. For instance, the first participant 102a may have an index of 1, and generate the blinding key share using $\kappa_1$=JVRSS(1) for participant 1, where the blinding key is denoted by K. Each participant 102 may generate a respective blinding key share $\kappa_i$. For instance, the second participant 102b may generate a second blinding key share using $\kappa_2$=JVRSS(2) for participant 2, and so on.

Generating the blinding key $\kappa_1$ share using the joint secret sharing scheme comprises the same steps described above for generating the private key share $a_1$, except that the random numbers used for generating the blinding key share $\kappa_1$ are different numbers comparted to those used for generating the private key share $a_1$.

Like the private key shares $a_i$, an alternative to JVRSS may be used when generating the blinding key shares $\kappa_i$.

At least a threshold number of the first group of participants 102 (i.e. those with a respective private key share $a_i$) that are also part of the new group of participants generate an intermediary key share $v_i$ based on their respective blinding key share and their respective private key shares a $a_i$. That is, the intermediary key share $v_i$ is a function of the blinding key share and the private key share $a_i$. Note that only those participants 102 part of the first group of participants 102 can generate this intermediary key share $v_i$ due to it depending on the private key share $a_i$. Note again that the intermediary key share $v_i$ may in general be any secret share and is not limited specifically to being a key or private key.

In some examples, the intermediary key share $v_i$ may be calculated as a sum of the blinding key share and the private key share, i.e. $v_i=a_i+\kappa_i$. However it is not excluded that the intermediary key share $v_i$ may be calculated in alternative ways, e.g. $v_i=a_i-\kappa_i$.

Those participants 102 that have calculated an intermediary key share $v_i$ transmit their respective share $v_i$ to each of the participants 102 in the new group of participants. The intermediary key shares $v_i$ may be transmitted directly between pairs of participants 102, or broadcast generally to the new group of participants 102, or otherwise published.

Each of the new group of participants 102 obtains the plurality of intermediary key shares $v_i$. Then, each of the new group of participants 102 calculates an intermediary key v based on the plurality of intermediary key shares $v_i$. That is, the intermediary key v is a function of each of the plurality of intermediary key shares $v_i$. For instance, each participant of the new group of participants 102 may interpolate over the intermediary key shares $v_i$.

Then, having obtained an intermediary key v, each of the new group of participants 102 generates a new share (e.g. an updated share) $a'_i$ of the private key a based on the intermediary key v and the blinding key share $\kappa_i$. That is, the new share $a'_i$ of the private key a is a function of the intermediary key v and the blinding key share $\kappa_i$.

In some examples, the new private key share $a'_i$ may be calculated as a sum of the intermediary key share and the private key share, i.e. $a'_i=v-\kappa_i$. However it is not excluded that the new private key share $a'_i$ may be calculated in alternative ways, e.g. $a'_i=v+\kappa_i$.

In general, a second secret share $\kappa_i$ is applied to the first secret share at with a first operation to generate an intermediary share $v_i$, and then one interpolates across the intermediary shares $v_i$ to generate the intermediary key v. Then the inverse of the first operation is performed on the intermediary key v and the second secret share $\kappa_i$ to find the new share of the first secret $a'_i$.

Each of the new group of participants 102 now has a new share of the private key. The new group of participants 102 may include participants 102 that previously did not have a share of the private key (i.e. the new group comprises participants 102 from the second group). Or, the new group may include participants 102 only from the first group of participants 102.

The threshold of the new shares $a'_i$ of the private key a are determined based on the threshold of the blinding share $\kappa_i$. The blinding share $\kappa_i$ may have the same threshold as the private key share $a_i$, such that the threshold of the new shares $a'_i$ of the private key remains the same. Alternatively, the blinding share $\kappa_i$ may have a higher threshold that the private key share $a_i$, such that the threshold of the new shares $a'_i$ of the private key a is higher than that of the previous shares $a_i$, and vice versa for the blinding shares $\kappa_i$ having a lower threshold.

When new shares are 'issued' there are now two ways to create the shared secret—with the old shares $a_i$, or with the new shares $a'_i$. If there is an attempt with a combination of old and new shares, the calculation will result in an incorrect share. Therefore the calculation will only work if each participant uses old share $a_i$, or if each participant uses their new share at. When a share is updated, an element of trust may be required of other participants to use their new share as well. Users that try to use their old share can be considered as adversaries, such that they are considered as adversaries before the updating or re-issuing of shares. As long as there are fewer 'adversaries' than the minimum threshold in the scheme (that is, the minimum of the threshold before and after updating the shares), then the scheme is secure since any attacks an adversary can execute will be caught and/or only result in the adversary being excluded from the scheme. Therefore there is no motivation to attack the scheme. The only issue is then if there are more adversaries than the threshold, but this is not a new issue—this exists in any shared secret scheme in general.

Figure 2:
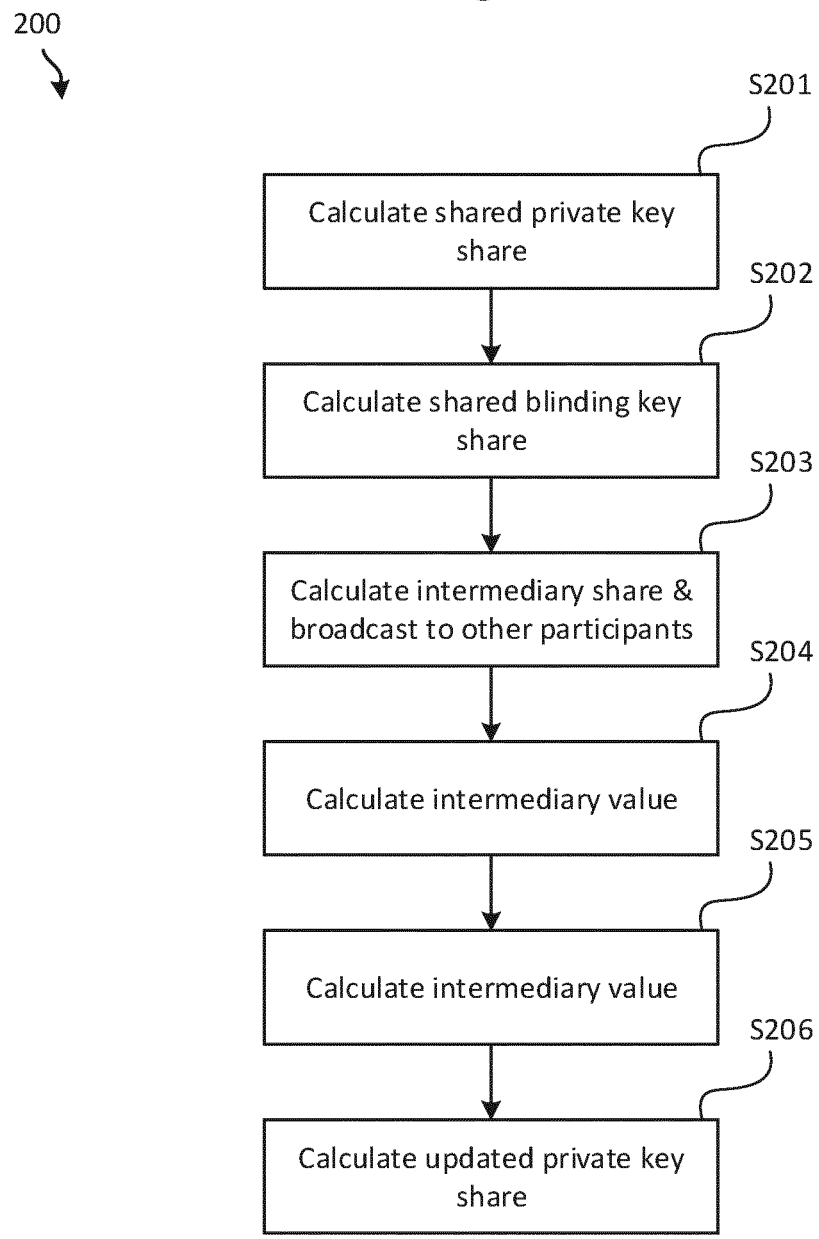

FIG. 2 illustrates an example method 200 performed by participants 102 of the scheme. This method may be used in the case of the loss of a share, or alternatively to add or remove participants 102 in a shared secret scheme. Additionally or alternatively, the method may also be used to change the threshold of the shared secret. To issue new shares $a'_i$, the following steps are taken.

In step S201, each participant of the old scheme has generated a share $a_i$ of the private key a, e.g. using JVRSS.

In step 202, each participant of the new scheme generates a blinding share $\kappa_i$=JVRSS(i) with threshold (t+1). Note that an alternative method for generating a key share may be used.

In step S203, at least (t+1) participants 102 with the old shares at each calculate the intermediary secret share $v_i=a_i+\kappa_i$. An alternative function of the private key share $a_i$ and the blinding key share $\kappa_i$ may be used.

In step S204, these participants 102 broadcast the intermediary secret shares to all participants 102.

In step S205, all participants 102 calculate the blinded secret with (t+1) of the intermediary shares v=interpolate $(v_1, \ldots, v_{t+1})$=a+κ.

In step S206, each participant calculates their own new secret share $a'_i=v-\kappa_i=(a+\kappa)-\kappa_i$. Depending on the function used in S203, an alternative function of the intermediary key v and the blinding key share $\kappa_i$ may be used.

These new secret shares can be used in the same way as the old secret shares and any calculations done with them will result in the old shared secret. A previous way to update shares was to simply add a second polynomial that does have a term that has degree zero, i.e. that the constant term is zero. The result is that you are not changing the shared secret that is defined to be the zeroth order term. This means that a private key with a threshold of two cannot be updated without increasing the threshold, as JVRSS cannot be executed for a secret with a polynomial of order 1 but a zero zeroth-order.

The security of a threshold signature scheme can be improved in two ways using the updating of shares. Firstly, if a share is found to be compromised, the participants 102 in the scheme can use this method immediately to render that share useless. Alternatively, a group executing this scheme can agree to update their shares intermittently such that any attacker must attack multiple places, and within a certain time frame. This means that the scheme is still secure over time. More generally, each participant of the new scheme may perform the steps of S202 to S206 on a periodic basis or upon request from one of the participants 102.

Note that in the case of loss of shares, it is only possible to reissue shares if there are at least (t+1) shares that are still known. Additionally, in the case of removing participants 102, the number of remaining participants 102 must be at least (t+1), or less shares will exist than the number required to create the secret. Note that one cannot pass the step s204 unless there at least (t+1) participants as it is not possible to calculate (a+κ) with less that (t+1) shares. This is also true for changing the threshold to a higher threshold. That is, there needs to be at least that threshold number in the scheme.

As mentioned above, the threshold of the shared secret a may be changed. The method 200 of FIG. 2 may be implemented to generate a new shared secret threshold of (t'+1) for the same secret a, then the participants 102 generate new shares with this threshold in the following way.

In step S201, each participant of the old scheme has generated a share $a_i$ of the private key a, those shares having a threshold of t+1.

In step S202, all participants 102 of the scheme generate a blinding share $\kappa_i$=JVRSS(i) of with threshold (t'+1), and label the highest one of the two thresholds by ($\bar{t}+1$)=max(t,t')+1.

In step S203, at least (t+1) participants 102 calculate their intermediary secret share $v_i=a_i+\kappa_i$. An alternative function of the private key share $a_i$ and the blinding key share $\kappa_i$ may be used.

In step S204, these participants 102 broadcast the intermediary secret share to all other participants 102.

In step S205, all participants 102 calculate the blinded secret v=interpolate $(v_1, \ldots, v_{\bar{t}+1})$=a+κ.

In step S206, each participant calculates their own new secret share $a'_i=v-\kappa=(a+\kappa)-\kappa_i$. Depending on the function used in S203, an alternative function of the intermediary key v and the blinding key share $\kappa_i$ may be used.

These new secret shares have a threshold of (t'+1), and interpolation over a threshold number of the shares will result in the shared secret a. If this is then used in a signature calculation (e.g. as described below), where the ephemeral key has a threshold of t, the new signature shares have a threshold of t+t'+1.

In some embodiments, both the number of shares $a'_i$ of the private key a and the threshold of the private key a may be changed.

Note that the security may only be increased if a threshold number of "old" shares is provably deleted. Enough shares must be provably deleted such that there are less than the old threshold number of shares left.

Assume a secret has a threshold of t+1 and it is to be increased to t'+1 where t'>t. Say there are n shares. Then in order to increase the security, there needs to be provably less than t+1 old shares remaining. i.e. the scheme needs to be certain that there is less than the threshold of the old shares still in existence. This is because if that is the case then there is no way for the secret to be calculated with the old shares. If t+1 old shares still exist, then the security is still t+1 as these can be used to calculate the secret, even if there are also new shares with a higher threshold. The security is based on the minimum number of shares required to calculate the secret.

The participants 102 of the new scheme may verify that the new shares $a'_i$ have been calculated correctly. This is done by adding the public keys corresponding to the individual secrets and comparing them with the public key corresponding to the result of the addition.

As explained in the preliminaries above, method for generating each secret a, κ, results in enough information to calculate the public key. So after calculating the public key a participant knows a·G, κ·G. To verify the results each participant may perform the following steps:

1. Calculate (a·G)+(κ·G)
2. Using (a+κ), calculate (a+κ)·G
3. Compare these results to verify that they are the same.

In addition, if a participant 102 finds an incorrect result, they can determine which shares are incorrect. To do this, the participant 102 stores $a_i$·G and $\kappa_i$·G for each participant. Then it is the same verification as above since the participant 102 knows $a_i$·G and $\kappa_i$·G. The participant also knows $a_i+\kappa_i$ since it is shared for the interpolation, so the same steps 1-3 are repeated with these values. The share that results in the values in step 3 not being equal is the incorrect share.

As mentioned, the new shares $a'_i$ may be used as part of a threshold signature scheme. That is, the new shares $a'_i$ may be private key shares of a private key a. The present invention may be used to update the participants' shares of the private key upon which the signature of the signature scheme is based. The number of new shares $a'_i$ may be changed, and/or the threshold of the new private key shares $a'_i$ may be changed.

Figure 3:
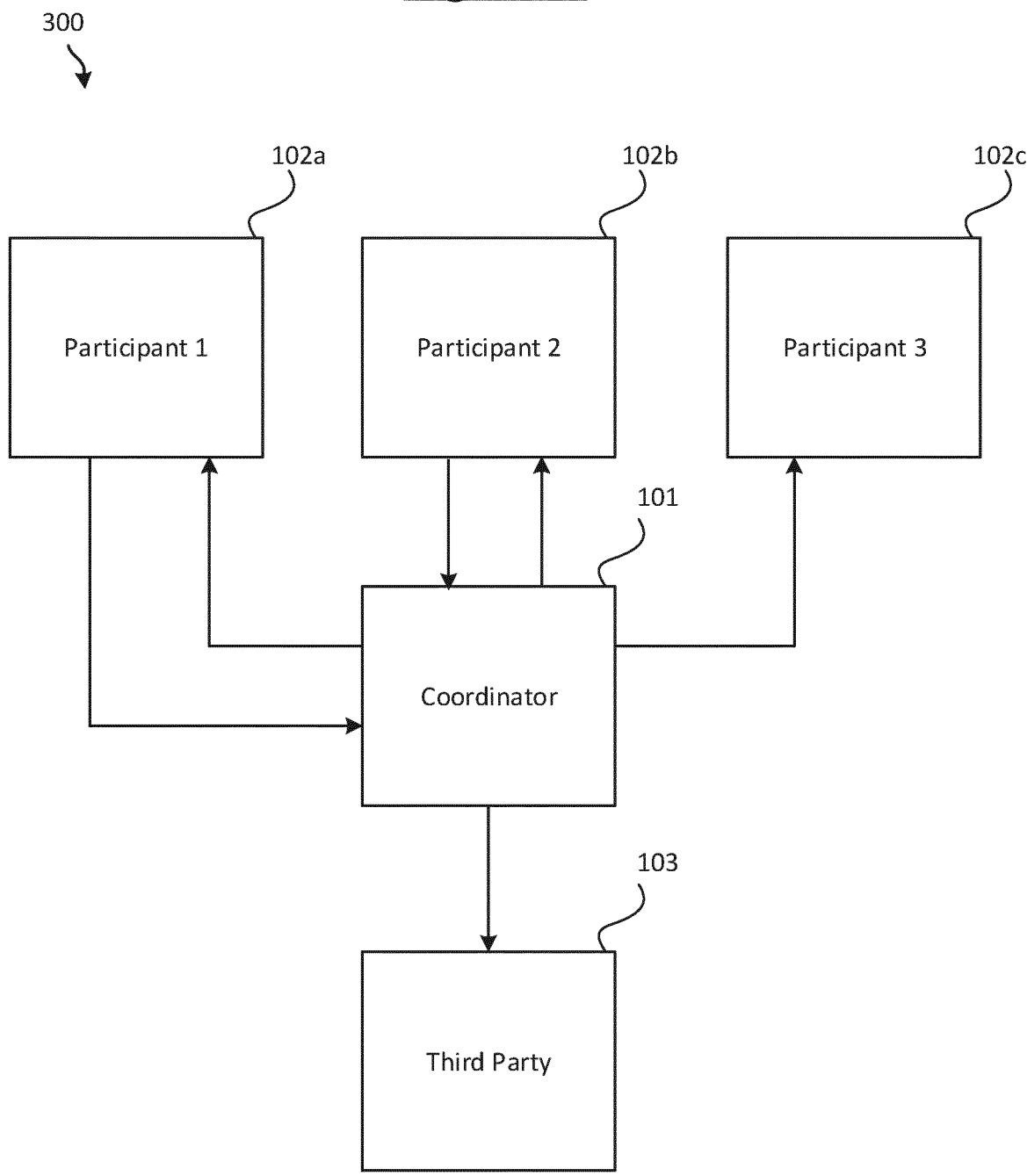

FIG. 3 illustrates an example system 300 for implementing a threshold optimal signature scheme, e.g. a threshold optimal ECDSA scheme, using the new private key shares $a'_i$. Note that if the old shares were used, the signature generated would be the same as the signature generated using the new shares. As shown, the system 100 comprises a plurality of participants 102, including a coordinator 101 and a group of participants 102. Only three participants 102 are shown in FIG. 3, but it will be appreciated that in general the system may comprise any number of participants. Furthermore, in FIG. 1 the coordinator 101 is shown as being distinct from the participants 102, but in some embodiments the coordinator 101 may also be one of the participants 102, e.g. the first participant 102a. The participants 102 have been described above with reference to FIG. 1.

Note that whilst the following describes a scheme implemented using an elliptic curve cryptography scheme, in general embodiments of the invention may be applied to other public-key cryptography schemes, e.g. RSA.

The coordinator 101 is the party that initiates the signature using a threshold number of signature shares generated by respective participants of a group of participants 102. That is, the coordinator 101 generates the signature on a message to be signed. Again, note that generating a signature on a message is taken to mean that a signature is dependent on the message to be signed, or put another way, the signature is a function of the message to be signed. The coordinator 101 may also be the party that sends the signature, and optionally the message, to a third party 103 or otherwise outputs the signature. For instance, the third party 103 may be a certificate authority or other form of authority, or another user. In other examples, the signature may be recorded, e.g. in a database or other document. In some examples, the signature may be made available to the public, e.g. recorded on a website or other publicly accessible medium.

The coordinator 101 may transmit a message to be signed to the participants 102. The message may be transmitted to all of the participants 102, or to a subset of the participants, e.g. the threshold number of participants. In the example of FIG. 1, the group of participants comprises three participants 102a, 102b, 102c. The coordinator 101 may transmit the message to one participant who then forwards the message to one, some or all of the other participants.

The message may be transmitted over the internet using a LAN or WAN connection, or via alternative wired or wireless communication means. The message may be transmitted to each participant 102 individually, e.g. via a secure communication channel between the coordinator 101 and each participant 102, or broadcast to the group as a whole, e.g. via email or other means. The message may be transmitted in raw form, or in encrypted form. For instance, the message may be hashed one or more times.

One or more of the participants 102 may obtain the message via alternative means, i.e. not from the coordinator 101. For example, the message may be generated by one of the participants 102, or otherwise available, e.g. publicly. One or more participants 102 may receive the message from a third party 103. A participant 102 that obtains the message may transmit the message (in raw or encrypted form) to one or more other participants 102. For instance, the first participant 102 may transmit the message to the second participant 102b and/or the third participant 102c.

The coordinator 101 obtains (e.g. receives) a threshold number of signature shares. In the example of FIG. 1, the threshold is two and only the first participant 102a and the second participant 102b decide to generate a respective signature share. For instance, one or more of the participants 102 that generate a signature share may transmit their respective share directly to the coordinator 101, e.g. via a secure communication channel. Alternatively, one or more of the participants 102 may broadcast their respective shares, and/or make their share publicly available. As set out above, the coordinator 101 may also be a participant. In those embodiments, the coordinator 101 may also generate a respective signature share. In that sense, obtaining at least one of the threshold number of signature shares means generating at least one signature share, and therefore the coordinator 101 only need receive one less than the threshold number of signature shares.

In order to obtain the signature shares, the coordinator 101 may transmit a request for signature shares on a message. For instance, the coordinator 101 may transmit a request for signature shares to one, some or all of the group of participants 102.

Having obtained at least the threshold number of signature shares, the coordinator 101 generates the signature using the obtained shares. The coordinator 101 may then broadcast or transmit the signature to one or more other entities. Additionally or alternatively, the coordinator may store the signature, and/or record the signature as part of a digital record, e.g. in an email or other document.

The method for generating a signature share $s_i$ will now be described. The method is described from the perspective of the first participant 102a, but it will be appreciated that each other participant 102 that generates a signature share does so using an equivalent method, albeit using certain data specific to that other participant 102.

Each participant 102 has access to the following data items: a respective private key share $a'_i$ (i.e. a share of the private key a), a respective ephemeral private key share $k_i$, and a common shared value r that is generated based on a common ephemeral public key k·G. The common ephemeral public key corresponds to, i.e. is generated based on, the ephemeral private key. Here, a value or key may be common in the sense that each participant has access to that same value or key. Note that unless specified, generating a second key based on a first key does not necessarily imply that the first key itself is known. Examples of how these data items may be generated are provided below.

The first participant 102a obtains, or already has access to, a message to be signed. The message may be in its raw form (e.g. plaintext), or in an encrypted or otherwise encoded for (e.g. ciphertext). The first participant 102a may obtain the message (in either form) from the coordinator and/or from another participant 102. Alternatively, the first participant 102a may generate the message to be signed.

The first participant 102a generates a first signature share $s_1$. Note that "first" in this context is just used as an arbitrary label to distinguish the particular participant and the particular signature share from other participants and signature shares respectively, and does not necessarily imply that the first participant 102a is the first participant to generate a signature share $s_i$, or that the first signature share $s_1$ is the first in an ordered list of signature shares $s_i$.

In some embodiments, the first signature share S1 may be generated based on, i.e. is a function of, a first message-independent component (MIC) and a first message-dependent component (MDC), where again "first" is just used as a label. The MIC is generated independently of the message. That is to say, the MIC is not a function of the message to be signed (i.e. the MIC is not generated based on the message), and knowledge of the message is not required to generate the MIC. In contrast, the MDC is a function of the message to be signed and knowledge of the message is required to generate the MDC.

In other embodiments, the first signature may not be a function of the first message-independent components (MIC). In these embodiments, the first message-independent component is generated and made available to the coordinator 101, e.g. transmitted to the coordinator 101 or broadcast to one or more participants 102. The first message independent component (MIC) may be shared with the coordinator in advance of, and separately from the first signature share.

The coordinator 101 may obtain a respective message-independent component (MIC) from at least the threshold number of participants, and generate the signature based on the respective signature shares (which are a function of the respective message-dependent components (MDC)) and the respective message-independent components (MIC). More details are provided below.

Since the MIC does not require knowledge of the message, the MIC can be pre-calculated. In other words, the MIC can be generated before obtaining the message. Therefore a plurality of different MICs can be pre-calculated, each for use in generating a different respective signature shares $s_1'$ for signing different messages, where the prime (') indicates that it is a different instance of the first signature share.

Having generated the first signature share $s_1$, the first participant 102a makes the first signature share $s_1$ available to the coordinator 101 for generating the signature s on the message. If the first participant 102a is the coordinator 101, making the first signature share S1 available to the coordinator 101 may merely mean outputting the first signature share s1 to a function for generating the signature s. Otherwise, the first participant 102a may transmit the first signature share S1 to the coordinator 101, or to one or more other participants 102 for forwarding to the coordinator 101, or broadcast the first signature share $s_1$, or use a combination of these options.

As stated above, the first signature share $s_1$ may be generated based on a first MIC and a first MDC. Regardless of whether the first signature share is a function of the first MIC, the first MIC is generated based on (i.e. is a function of) the first private key share $a_1$ (i.e. the share of the private key a known to the first participant 102a). The first MIC may also be based on the first ephemeral private key share $k_1$ (i.e. the share of the ephemeral private key k known to the first participant 102a) and the shared value r generated based on the ephemeral public key k·G corresponding to the ephemeral private key k. The first MDC is generated based on (i.e. is a function of) the message (in raw or encrypted form) and may also be generated based on the first ephemeral private key share $k_1$. Variations of the MIC and MDC are provided below.

The first ephemeral private key share $k_1$ may be calculated using a joint secret sharing scheme, e.g. using the JVRSS technique described above. For instance, the first participant 102a may have an index of 1, and generate the first ephemeral private key share using $k_1$=JVRSS(1) for participant 1, where the ephemeral private key is denoted by k. Each participant 102 may generate a respective ephemeral private key share $k_i$. For instance, the second participant 102b may generate a second ephemeral private key share using $k_2$=JVRSS(2) for participant 2, and so on.

Generating the first ephemeral private key $k_1$ share using the joint secret sharing scheme comprises the same steps described above for generating the first private key share $a_1$, except that the random numbers used for generating the ephemeral private key share $k_1$ are different numbers comparted to those used for generating the private key share $a_1$.

Note that the same private key a, and private key shares $a_i$ are used for each signature, whereas the ephemeral private key k and ephemeral private key shares $k_i$ are changed for each signature (or rather they are randomly generated and therefore very unlikely to be the same, as opposed to being purposefully chosen to be different).

The shared value r is generated based on the ephemeral public key k·G corresponding to the ephemeral private key k. The ephemeral public key (x, y) comprises two components, usually referred to as the x and y components. The shared value r may be a function of the x component of the ephemeral public key, e.g. r=x mod n.

The ephemeral public key k·G may be generated based a set of obfuscated coefficients, wherein the coefficients were used to generate the respective ephemeral private key shares $k_i$ of each participant 102. That is, when generating the ephemeral private key share $k_i$, each participant 102 shares the obfuscated coefficients $k_{ij}$·G with each other participant 102. The coefficients are obfuscated by a common generator point G on the chosen elliptic curve. These obfuscated coefficients may be transmitted between participants 102 directly, or broadcast to the group. For instance, the first participant 102a may broadcast the obfuscated coefficients $k_{10}$·G, $k_1^{-1}$·G, $k_{12}$·G, and so on. The ephemeral public key may then be calculated as $$(x, y) = \sum_{i=1}^{N}(k_{i0} \cdot G).$$

In some embodiments, the first MIC is generated based on a first inverse share $k_1^{-1}$ corresponding to the first ephemeral private key share $k_1$. That is, the first inverse share $k_1^{-1}$ is a function of the first ephemeral private key share $k_1$.

The first inverse share $k_1^{-1}$ may be an inverse of shared secrets, for example, generated by calculating $k_1^{-1}$=INVSS (1) for participant 1. As set out above, calculating the inverse of shared secrets comprises calculating the product of shared secrets. The first participant 102a generates an intermediate value u as the product of the first ephemeral private key k and a first blinding key a. For instance, the intermediate value may be calculated as by µ=kα=PROSS (1) for participant 1, the result of which is µ=kα mod n.

This may involve each participant 102 generating a multiplicative share $µ_i=k_iα_i$, where $α_i$ is a share of the first blinding key α. Each participant 102 may calculate their respective share $α_i$ of the first blinding key α using a joint secret sharing scheme, e.g. using the JVRSS technique described above. For instance, the first participant 102a may have an index of 1, and generate a share of the first blinding key using $α_1$=JVRSS(1) for participant 1. Each participant shares (e.g. via direct transmission or broadcasting) their respective multiplicate share $µ_i$, and then generate the intermediate value u based on each of the multiplicative shares $µ_i$, e.g. by interpolation. The first inverse share $k_1^{-1}$ may be generated by calculating the inverse of the intermediate value u. For instance, the first participant 102a may calculate the modular inverse of μ which results in $$\mu^{-1} = (k\alpha)^{-1} \bmod n.$$

The first participant 102a may then calculate the first inverse share $k_1^{-1}$ based on the modular inverse $\mu^{-1}$ of the intermediate value and their respective first blinding key share $\alpha_1$, e.g. by calculating $$k_1^{-1} = \mu^{-1}\alpha_1.$$

Note that the use of the blinding key share $\alpha_i$ is optional and may be omitted from the above steps.

Optionally, the MIC may be generated based on (i.e. a function of) a share of a second blinding key β. That is to say, the MIC is also based on the first share $\beta_1$ of the second blinding key β, in addition to the previously mentioned data items. The first share of the second blinding key may be calculated using a joint secret sharing scheme, e.g. using the JVRSS technique described above. For instance, the first participant 102a may have an index of 1, and generate the first share of the second blinding key using $\beta_1$=JVRSS(1) for participant 1, where the second blinding key is denoted by β.

The MIC may be generated based on a first pre-signature share $\sigma_1$ which is a function of a first intermediary share $\lambda_1$ and a respective intermediary share $\lambda_i$ obtained from at least the threshold number of participants 102. That is, each of the participants 102 may generate a respective intermediate share $\lambda_i$ and transmit and/or broadcast those intermediate shares $\lambda_i$ to the other participants 102. The first participant 102a may collect the intermediary shares $\lambda_i$ to generate a common intermediary value λ, e.g. by interpolation of the intermediary shares $\lambda_i$. The first participant 102a, (and optionally, the other participants 102) may generate a plurality of pre-signature shares $\sigma_1'$, each for use in the generation of different signature shares $s_1'$.

The first intermediary share $\lambda_1$ may be a function of the new first private key share $a'_i$ and the first inverse share $k_1^{-1}$. In that case, each of at least the threshold number of participants 102 generates and shares a respective intermediary share $\lambda_i$ that is a function of their respective private key share $a'_i$ and their respective inverse share $k_i^{-1}$.

Alternatively, the first intermediary share $\lambda_1$ may be a function of the first private key share $a'_i$ and the first share of the first blinding key $\alpha_1$. In that case, each of at least the threshold number of participants 102 generates and shares a respective intermediary share $\lambda_i$ that is a function of their respective private key share $a'_i$ and their respective share of the first blinding key $\alpha_1$.

In some embodiments, the first pre-signature share $\sigma_1$ may also be generated based on the first share of the second blinding key $\beta_1$. For instance, the first intermediary share $\lambda_1$ may be a function of the first share of the second blinding key $\beta_1$. In additional or alternative embodiments, the first intermediary share $\lambda_1$ may also be a function of the common value r.

FIG. 4 illustrates an example method 400 for generating a signature on a message according to embodiments of the invention. Steps S401 to S408 are performed by each of a threshold number of participants 102 in this example (including the first participant 102a). Step S409 is performed by a coordinator 101, who may also may one of the participants performing steps S401 to S408. It will be appreciated that some of the steps may be omitted or be performed in a different order.

The example method 400 enables the creation of a shared secret of threshold (t+1) in a group of N≥2t+1 participants, where the signing threshold is also (t+1).

Set-Up:

In step S401, each participant 102 calculates a shared private key share $a'_i$ and a corresponding public key. The generation of the private key share $a'_i$ has been described above. At this point, each participant i has a secret key share and public key ($a'_i$, P), where P is notation for the public key corresponding to the shared private key. The shared private key has a threshold of (t+1).

Pre-Calculation:

In step S402, each participant 102 calculates a shared ephemeral key share and a corresponding public key. For instance, each participant 102 may calculate a shared ephemeral key using JVRSS and the calculation of the public key given in the preliminaries. Each participant 102 may then calculate an inverse share based on the ephemeral private key. This results in each participant having an inverse share ($k_i^{-1}$, r), with a threshold of (t+1).

In step S403, each participant 102 creates two different shared blinding key shares. For instance, each participant 102 may create two shared secrets so that participant i has shares $\alpha_i$=JVRSS(i) and $\beta_i$=JVRSS(i), each shared secret having a threshold (t+1). Note that in some examples, not all of the shared secrets need to have the same threshold.

In step S404, each participant 102 calculates an intermediary share and broadcasts their intermediary share to the other participants. For instance, each participant i may calculate the intermediary share $\lambda_i = k_i^{-1}a'_i + \beta_i$. This value has a threshold of (2t+1).

In step S405, each participant 102 calculates an intermediary value based on at least the intermediary shares. For instance, each participant 102 may calculate the intermediary value using interpolation over (2t+1) shares $\lambda$=interpolate($\lambda_1, \ldots, \lambda_{2t+1}$)=$k^{-1}a+\beta$.

In step S406, each participant 102 calculates a pre-signature share. For instance, each participant i may calculate their pre-signature share $\sigma_i = \lambda - \beta_i = (k^{-1}a+\beta) - \beta_i$. Each participant 102 may store (r, $k_i^{-1}$, $\sigma_i$), and the private key share and corresponding public key ($a'_i$, P).

Note that since a different ephemeral key is used for each signature, multiple ephemeral keys can be set up at one time, that is, steps S402 to S406 can be repeated to create multiple ephemeral keys during pre-calculation and stored for later use. These can be executed at the same time so that there are no additional rounds of communication. Note that preferably, a different value of a and B should be used for each signature.

Signature Generation:

In order to sign a message msg, at least (t+1) participants must perform steps S407 and S408.

In step S407, at least the threshold number of participants 102 obtain a message to be signed and calculate a message digest. For instance, a coordinator 101 may send a request to (t+1) participants to create a signature share on the message msg. Each participant i may calculate the message digest e=hash(msg). In some examples, this hash function is the double SHA-256 hash function. Alternative hash functions may be used.

In step S408, at least the threshold number of participants 102 calculate a signature share and send it to the coordinator 101. For instance, each participant i may calculate their signature share $s_i = k_i^{-1}e + r\sigma_i$, and then send their signature share (r, $s_i$) to the coordinator. Note that the value r may not be sent by all participants.

In step S409, the coordinator 101 calculates the signature. For instance, the coordinator 101 may calculate s=interpolate $(s_1, \ldots, s_{t+1})=k^{-1}(e+ar)$, and finally the signature (r, s).

There are several alternatives for pre-calculating the message independent component of the signature share. These can broadly be split into two sets of variations: when to include r in the calculation, and when to include $(k\alpha)^{-1}$. These can be selected independent of each other and so there are eight variations to the above method 400.

One modification is to store $(r, k_i^{-1}, r\sigma_i)$ during step S406, meaning that r is included in the pre-signature share. Another modification is that the multiplication with r can also come earlier during the calculation of the intermediary shares. By defining instead $\lambda_i=rk_i^{-1}a'_i+\beta_i$ in step S404, then in step S406, $\sigma_i=\lambda-\beta_i=(rk^{-1}a+\beta)-\beta_i$ and the calculation of signature shares is $s_i=k_i^{-1}e+\sigma_i$.

Another modification is to instead calculate $\lambda_i=\alpha_i a'_i+\beta_i$ such that $\lambda=(k\alpha)^{-1}(\alpha a+\beta)$, and $\sigma_i=\lambda-(k\alpha)^{-1}\beta_i$. The two variations of including r at alternative points can be done in combination with this. Each participant has knowledge of $k\alpha$ as it is calculated in step S402 of the pre-calculation. Additionally, all participants 102 broadcast their $\lambda_i$ share. So each participant 102 has knowledge of (at least) 2t+1 shares and the value $k\alpha$. They can then calculate $$\lambda=(k\alpha)^{-1}\times\text{interpolate}(\lambda_1,\ldots,\lambda_{2t+1})$$

Another modification is to instead calculate the intermediary value as $\lambda=(\alpha a+\beta)$ and the pre-signature share as $\sigma_i=\lambda-\beta_i$. Finally, the signature share would then be $s_i=k_i^{-1}e+r(k\alpha)^{-1}\sigma_i$. The two variations of when to include r in the calculation can also be done in combination with this. Each participant 102 has knowledge of $k\alpha$ from the calculation of $k_i^{-1}$. They can then calculate $(k\alpha)^{-1}$ mod n with this, and then include it in the calculation of $s_i$.

In summary, each participant 102 may generate four secret shares: $a'_i, k_i, \alpha_i, \beta_i$. Two products need to be calculated in the example method 400: $k\alpha$ which is then used to calculate $(k\alpha)^{-1}a'_i=k_i^{-1}$ (interpolation over these shares gives $k^{-1}$ as the $\alpha$'s will cancel, and $k^{-1}a$ for use in the signature, which uses the first product, and so if the shares are expanded, the calculated gives $k_i^{-1}a'_i=(k\alpha)^{-1}\alpha_i a'_i$. Any calculations with the $k_i^{-1}$ share, which is made of $k\alpha$ and $\alpha_i$, can be done by doing the calculation just with $\alpha_i$ itself first, and then multiplying by $(k\alpha)^{-1}$ where necessary.

One version of the above scheme can be summarised by saying that a signature is calculated using shares that are composed of a message independent component (MIC) and a message dependent component (MDC), where the MIC may be based on the pre-signature share $\sigma_i$ and the MDC is based on the message e.

An equivalent scheme comprises calculating the MIC as above, and then incorporating this in the signature along with the signature shares, e.g. after interpolation of the signature shares which are made of just an MDC. Explicitly, the scheme may be same up to step S406 of the pre-calculation, where the intermediary shares include the r value, $\lambda_i=k_i^{-1}a'_i r+\beta_i$ such that after interpolation this is $\lambda=k^{-1}ar+\beta$.

At this stage, the participants have knowledge of $(r, k_i^{-1}, \lambda, \beta_i)$ and store this along with the private key share and corresponding public key $(a'_i, P)$.

Then in order to generate their signature share on a given message m which is hashed to create the message digest e=hash(m), the participants calculate $$s_i=k_i^{-1}e-\beta_i,$$

and send this to a coordinator. The coordinator then calculates $$s=\text{interpolate}(s_1,\ldots,s_{t+1})+\lambda, =k^{-1}e+k^{-1}ar,$$

resulting in the expected signature share since the $\beta$ terms cancel. Similar variations of this protocol can be made as above describing when the $(k\alpha)^{-1}$ and r is included in the calculation.

The following variations for calculating the message-independent component may be implemented:

i) Calculate $\lambda=k^{-1}a+\beta$, then the signature shares are now $s_i=k_i^{-1}e-r\beta_i$, and the signature is generated as $s=\text{int}(s_1,\ldots,s_{t+1})+\lambda$.

ii) Calculate $\lambda=\alpha ar+\beta$, then the signature shares are now $s_i=\alpha_i e-\beta_i$, and the signature is generated as $s=(k\alpha)^{-1}(\text{int}(s_1,\ldots,s_{t+1})+\lambda)$.

iii) Calculate $\lambda=\alpha a+\beta$, then the signature shares are now $s_i=k_i^{-1}e-r\beta_i$, and the signature is generated as $s=(k\alpha)^{-1}(\text{int}(s_1,\ldots,s_{t+1})+r\lambda)$.

iv) Calculate $\lambda=\alpha ar+\beta$, then the signature shares are now $s_i=k_i^{-1}e-(k\alpha)^{-1}\beta_i$, and the signature is generated as $s=(\text{int}(s_1,\ldots,s_{t+1})+(k\alpha)^{-1}\lambda)$.

v) Calculate $\lambda=\alpha a+\beta$, then the signature shares are now $s_i=k_i^{-1}e-r(k\alpha)^{-1}\beta_i$, and the signature is generated as $s=(\text{int}(s_1,\ldots,s_{t+1})+r(k\alpha)^{-1}\lambda)$.

Note that the thresholds of the secrets may be different. That is the threshold of a, k, $\alpha$, $\beta$ themselves do not necessarily need to be the same to execute the signature generation scheme. For example, if there is a group of six and three are needed to create the signature and/or private key, they could technically do the calculation with the threshold of the k being four and the thresholds of the other shared secrets being three, and they will still have a threshold-optimal scheme.

Note that the present invention may be applied to any threshold signature scheme (whether optimal or non-optimal) and is not limited to the particular scheme described above.

In general, embodiments of the present invention can be used to generate a signature on any message. As a particular example use case, the message may be part or all of a blockchain transaction. That is, the signature may be used to sign one or more inputs and/or one or more outputs of a blockchain transaction. For instance, the generated signature may be used, at least in part, to unlock an output of a blockchain transaction. As a particular example, the output of a previous transaction may be a pay-to-public-key-hash (P2PKH) output which is locked to a hash of a public key. In order to be unlocked, an input of a later transaction that references the P2PKH output needs to include the (unhashed) public key and a signature generated based on the private key corresponding to the public key.

Represented in script, the "locking script" and "unlocking script" may take the following forms:

Locking script=OP_DUP OP_HASH160<Public Key-Hash> OP_EQUAL OP_CHECKSIG Unlocking script=<Signature> <Public Key>

Referring to the above described embodiments, the <Public Key> may be equated to $P=a\cdot G$, and the <Signature> comprises the threshold signature s, where the previous transaction is the message to be signed. Note that as stated above, ECDSA signatures are in the form (r,s).

The present invention may be used to change which participants can generate a signature share and therefore which participants must come together to unlock funds, i.e. unlock an output of a blockchain transaction. Additionally or alternatively, the present invention can be used to increase the number of participants required to unlock the funds.

Note that the described signature generation method is not limited to any particular use case and may in general be used for generating a signature based on any message. Signing all or part of a blockchain transaction is just one illustrative example. The described method may be used to sign and/or authorise, for instance, a legal document (e.g. a will, deed or other contract), correspondence between one or more parties, digital certificates (e.g. issued by a certificate authority), medical prescriptions, a bank transfer or a financial instrument, a mortgage or loan applications, etc.

As a particular example, the group of participants (say five participants in total) may form the Board of a company. Voting matters of the company may require a majority of the Board (i.e. at least three participants) to agree on the particular vote. The Board may use the described signature generation method to prove that at least three Board members agreed to vote in favour of a particular outcome. In this example, the threshold of the signature generation scheme is three. That is, at least three of the Board members must provide a respective signature share in order for the co-ordinator to successfully generate a signature. If a signature is generated successfully, at least the threshold number (i.e. three) of Board members must have agreed to vote in favour of that outcome. Thus the successful generation of a signature acts as a record of the vote and proves that a majority of the Board voted in a particular way.

The present invention may be used to change who can vote on such matters, and/or to increase or decrease the number of votes (i.e. shares) required to successfully decide on an outcome of a vote.

Another use case for the present invention lays in the field of digital certificates, e.g. digital certificate issued by the X.509 standard. A digital certificate contains a signature that signs over some data. The data can in general be any data, but one particular example of data included in a digital certificate is a public key. A public key in a digital certificate is often referred to as a "certified public key". The issuer of the digital certificate (a "certificate authority") may perform one or more checks on the owner of the public key (e.g. know-your-customer checks), and if the checks are successful, the certificate authority issues a digital certificate that includes the certified public key. A user can use a certified public key to prove they are who they say they are, e.g. by signing a message with a private key corresponding to the certified public key.

One particular use for certificate authorities is to sign certificates used in HTTPS for secure browsing on the internet. Another common use is in issuing identity cards by national governments for use in electronically signing documents. The certificate authority signs the public key (or any other data to be attested to) using a private key. The present invention may be used to change which participants have shares of the private key. The security of the private key may also be improved by increasing the threshold of the private key.

The principle behind the invention is for a group of participants to generate new shares of a shared secret based on a respective blinding share. The blinding share allows participants that have an old share of the shared secret to distribute blinded (i.e. obfuscated) versions of the old share to participants of the "new" group, in the form of "intermediary shares". The intermediary shares are combined (or otherwise interpolated) to form an intermediary from which each of the group of participants can apply (e.g. subtract or add) their blinding share to obtain their respective new share of the shared secret. Whilst the invention has primarily been described in terms of an ECC implementation, the invention applies equally to other implementations, e.g. RSA.

It will be appreciated that the above embodiments have been described by way of example only. More generally there may be provided a method, apparatus or program in accordance with any one or more of the following Statements.

Statement 1. A computer-implemented method of generating shares of a shared secret, wherein each of a group of participants has a respective first secret share of the shared secret, wherein the method is performed by a first participant of the group and comprises: generating a respective blinding share of a shared blinding secret, obtaining at least a threshold number of respective intermediary shares from each of the first group of participants, wherein each respective intermediary share is generated based on a respective blinding share and a respective first secret share;

generating an intermediary value based on each of the obtained intermediary shares; and generating a respective second secret share of the shared secret, wherein the respective second secret shared is generated based on the intermediary value and the respective blinding share.

Statement 2. The method of statement 1, wherein a first one of the respective intermediary shares is generated by the first participant.

Statement 3. The method of statement 1 or statement 2, wherein a threshold of the shared secret is equal to the threshold of the shared blinding secret.

Put another way, the threshold of the second secret shares is the same as the first secret shares.

Statement 4. The method of statement 1 or statement 2, wherein a threshold of the shared secret is different compared to the threshold of the shared blinding secret.

That is, the threshold of the second secret shares is different compared to the first secret shares.

Statement 5. The method of statement 4, wherein the threshold of the shared secret is greater than the threshold of the shared blinding secret.

Statement 6. The method of statement 4, wherein the threshold of the shared secret is less than the threshold of the shared blinding secret.

Statement 7. The method of any preceding statement, wherein the respective blinding share of the shared blinding secret is generated using a joint verifiable secret sharing scheme.

Statement 8. The method of statement 7, wherein generating the respective blinding share using the joint secret sharing scheme comprises:

generating a first data item, the first data item being a first polynomial;

obtaining a respective data item from at least the threshold number of participants, each respective data item being a respective polynomial generated by a respective participant; and generating the respective blinding share based on the first data item and each of the respective data items.

Statement 9. The method of statement 7 or statement 8, wherein obtaining the respective data items comprises obtaining the respective data items over a respective communication channel between the first participant and each of the threshold number of participants.

Statement 10. The method of any of statements 7 to 9, comprising transmitting a respective instance of the first polynomial to at least each of the threshold number of participants, wherein the respective instance of the first polynomial is based on a respective participant.

Statement 11. The method of any of statements 1 to 7, wherein the respective blinding share of the shared blinding secret is generated using a Shamir's secret sharing scheme.

Statement 12. The method of any preceding statement, wherein the respective first secret share of the shared secret is generated using a joint verifiable secret sharing scheme.

Statement 13. The method of any of statements 1 to 11, wherein the respective first secret share of the shared secret is generated using a Shamir's secret sharing scheme.

Statement 14. The method of any preceding statement, wherein the shared secret is a private key and the respective second secret share is a respective private key share of the private key.

Statement 15. The method of statement 14, wherein the shared blinding secret is a blinding private key, wherein the intermediary value is an intermediary private key, and wherein the method comprises:
  generating a first public key corresponding to the private key;
  generating a second public key corresponding to the blinding private key;
  generating a third public key corresponding to the intermediary private key;
  generating a first value based on the first and second public keys; and
  verifying that the second secret share of the shared secret has been generated correctly based on whether the first value matches the third public key.

Statement 16. The method of statement 15, comprising:
  in response to determining that the second secret share has not been generated correctly, performing the following steps for one, some or all of the other respective participants:
  obtaining a respective first public key corresponding to the respective first secret share of that participant;
  obtaining a respective second public key corresponding to the respective blinding share of that participant;
  obtaining a respective third public key corresponding to the respective intermediary share of that participant;
  generating a respective first value based on the respective first and second public keys of that participant; and
  verifying that the respective second secret share of the shared secret has been generated correctly by that participant based on whether the respective first value matches the respective third public key.

Statement 17. The method of any of statements 14 to 16, comprising:
  obtaining a message; and
  generating a digital signature share based on the message and the respective share of the private key.

Statement 18. The method of any of statements 14 to 16, comprising:
  obtaining a message;
  generating a first message-independent component and a first message-dependent component, wherein the message-independent component is generated based on the respective private key share and wherein the message-dependent component is generated based on the message;
  causing the first message-independent component to be made available to a coordinator; and
  causing a first signature share to be made available to the coordinator for generating the signature based on at least the threshold number of signature shares, wherein the first signature share comprises at least the message-dependent component.

Statement 19. Computer equipment comprising:
  memory comprising one or more memory units; and
  processing apparatus comprising one or more processing units, wherein the memory stores code arranged to run on the processing apparatus, the code being configured so as when on the processing apparatus to perform the method of any of statements 1 to 18.

Statement 20. A computer program embodied on computer-readable storage and configured so as, when run on computer equipment, to perform the method of any of statements 1 to 18.

According to another aspect disclosed herein, there may be provided a method comprising the actions of each participant.

According to another aspect disclosed herein, there may be provided a system comprising the computer equipment of each participant.

Other variants or use cases of the disclosed techniques may become apparent to the person skilled in the art once given the disclosure herein. The scope of the disclosure is not limited by the described embodiments but only by the accompanying claims.

The invention claimed is:

1. A computer-implemented method of generating shares of a shared secret, wherein each of a group of participants has a respective first secret share of the shared secret, wherein the method is performed by a first participant of the group and comprises:
  generating a respective blinding share of a shared blinding secret,
  obtaining at least a threshold number of respective intermediary shares from each of the first group of participants, wherein each respective intermediary share is generated based on a respective blinding share and a respective first secret share;
  generating an intermediary value based on each of the obtained intermediary shares; and
  generating a respective second secret share of the shared secret, wherein the respective second secret share is generated based on the intermediary value and the respective blinding share.

2. The method of claim 1, wherein a first one of the respective intermediary shares is generated by the first participant.

3. The method of claim 1 wherein a threshold of the shared secret is equal to the threshold of the shared blinding secret.

4. The method of claim 1, wherein a threshold of the shared secret is different compared to the threshold of the shared blinding secret.

5. The method of claim 4, wherein the threshold of the shared secret is greater than the threshold of the shared blinding secret.

6. The method of claim 4, wherein the threshold of the shared secret is less than the threshold of the shared blinding secret.

7. The method of claim 1, wherein the respective blinding share of the shared blinding secret is generated using a joint verifiable secret sharing scheme.

8. The method of claim 7, wherein generating the respective blinding share using the joint secret sharing scheme comprises:
generating a first data item, the first data item being a first polynomial;
obtaining a respective data item from at least the threshold number of participants, each respective data item being a respective polynomial generated by a respective participant; and
generating the respective blinding share based on the first data item and each of the respective data items.

9. The method of claim 8, wherein obtaining respective data items comprises obtaining the respective data items over a respective communication channel between the first participant and each of the threshold number of participants.

10. The method of claim 8, comprising transmitting a respective instance of the first polynomial to at least each of the threshold number of participants, wherein the respective instance of the first polynomial is based on a respective participant.

11. The method of claim 1, wherein the respective blinding share of the shared blinding secret is generated using a Shamir's secret sharing scheme.

12. The method of claim 1, wherein the respective first secret share of the shared secret is generated using a joint verifiable secret sharing scheme.

13. The method of claim 1, wherein the respective first secret share of the shared secret is generated using a Shamir's secret sharing scheme.

14. The method of claim 1, wherein the shared secret is a private key and the respective second secret share is a respective private key share of the private key.

15. The method of claim 14, wherein the shared blinding secret is a blinding private key, wherein the intermediary value is an intermediary private key, and wherein the method comprises:
generating a first public key corresponding to the private key;
generating a second public key corresponding to the blinding private key;
generating a third public key corresponding to the intermediary private key;
generating a first value based on the first and second public keys; and
verifying that the second secret share of the shared secret has been generated correctly based on whether the first value matches the third public key.

16. The method of claim 15, comprising:
in response to determining that the second secret share has not been generated correctly, performing the following steps for one, some or all of other respective participants in the group of participants:
obtaining a respective first public key corresponding to the respective first secret share of that participant;
obtaining a respective second public key corresponding to the respective blinding share of that participant;
obtaining a respective third public key corresponding to the respective intermediary share of that participant;
generating a respective first value based on the respective first and second public keys of that participant; and
verifying that the respective second secret share of the shared secret has been generated correctly by that participant based on whether the respective first value matches the respective third public key.

17. The method of claim 14, comprising:
obtaining a message; and
generating a digital signature share based on the message and the respective share of the private key.

18. The method of claim 14, comprising:
obtaining a message;
generating a first message-independent component and a first message-dependent component, wherein the message-independent component is generated based on the respective private key share and wherein the message-dependent component is generated based on the message;
causing the first message-independent component to be made available to a coordinator; and
causing a first signature share to be made available to the coordinator for generating the signature based on at least a threshold number of signature shares, wherein the first signature share comprises at least the message-dependent component.

19. A computer system, comprising:
memory comprising one or more memory units; and
processing apparatus comprising one or more processing units, wherein the memory stores code arranged to run on the processing apparatus, the code being configured so as when run on the processing apparatus, the processing apparatus performs a method of generating shares of a shared secret, wherein each of a group of participants has a respective first secret share of the shared secret, wherein the method is performed by a first participant of the group and comprises:
generating a respective blinding share of a shared blinding secret,
obtaining at least a threshold number of respective intermediary shares from each of the first group of participants, wherein each respective intermediary share is generated based on respective blinding share and respective first secret share,
generating an intermediary value based on each of the obtained intermediary shares, and
generating a respective second secret share of the shared secret, wherein the respective second secret share is generated based on the intermediary value and the respective blinding share.

20. A computer program embodied on a non-transitory computer-readable storage medium and configured so as, the computer program when executed by computer equipment, causes the computer equipment to perform a method of generating shares of a shared secret, wherein each of a group of participants has a respective first secret share of the shared secret, wherein the method is performed by a first participant of the group and comprises:
generating a respective blinding share of a shared blinding secret,
obtaining at least a threshold number of respective intermediary shares from each of the first group of participants, wherein each respective intermediary share is generated based on respective blinding shares and respective first secret shares;
generating an intermediary value based on each of the obtained intermediary shares; and
generating a respective second secret share of the shared secret, wherein the respective second secret share is generated based on the intermediary value and the respective blinding share.

* * * * *